Figure 1:
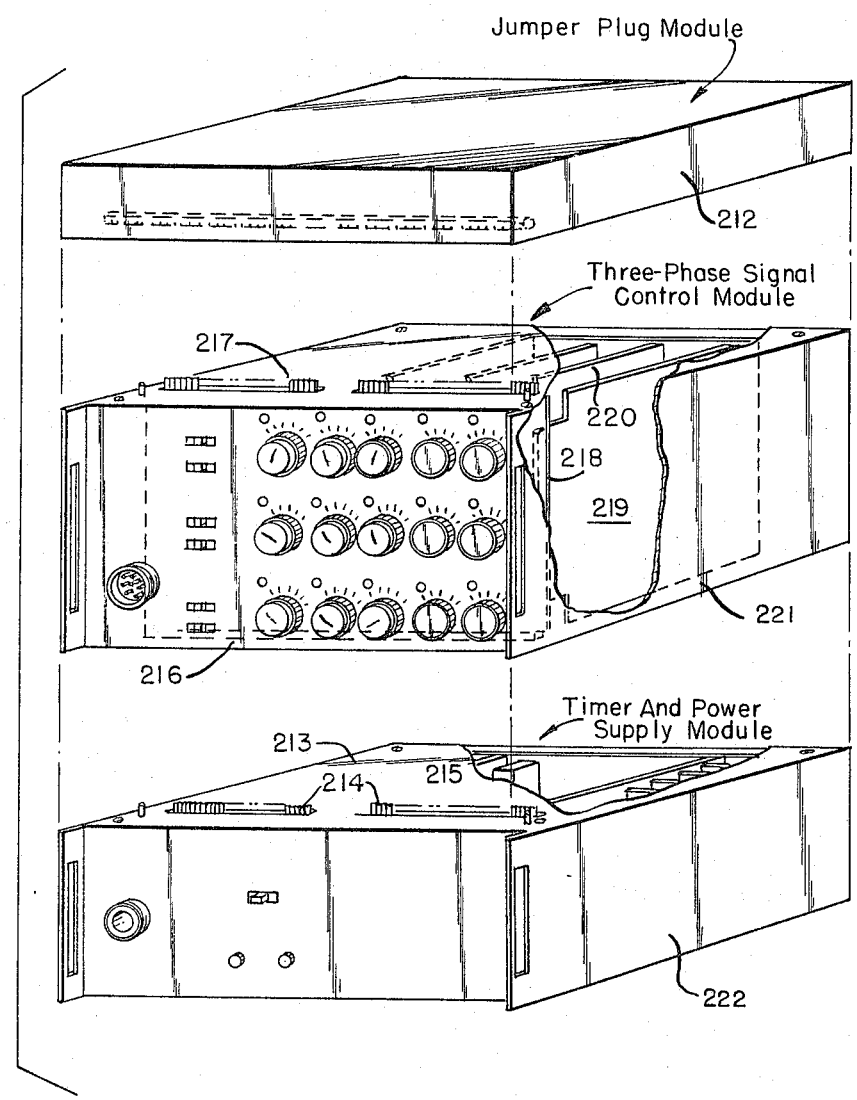

INVENTORS
Norman Arthur Bolton
Larry Appleman
Terence William Brady
Barry Lee Smith May 14, 1968   N. A. BOLTON ET AL   3,383,653
MODULAR TRAFFIC SIGNAL CONTROLLER
Filed Dec. 21, 1965   11 Sheets-Sheet 2

Two-Phase, Pre-Timed Controller

Three-Phase, Pre-Timed Controller

Five-Phase, Pre-Timed Controller

INVENTORS
Norman Arthur Bolton
Larry Appleman
Terence William Brady
Barry Lee Smith BY Hall, Pollock & Vande Sande
ATTORNEYS INVENTORS
Norman Arthur Bolton
Larry Appleman
Terence William Brady
Barry Lee Smith BY Hall, Pollock & Vande Sande
ATTORNEYS INVENTORS
Norman Arthur Bolton
Larry Appleman
Terence William Brady
Barry Lee Smith BY Hall, Pollock & Vande Sande
ATTORNEYS May 14, 1968 N. A. BOLTON ET AL 3,383,653
MODULAR TRAFFIC SIGNAL CONTROLLER
Filed Dec. 21, 1965 11 Sheets-Sheet 10

INVENTORS
Norman Arthur Bolton
Larry Appleman
Terence William Brady
Barry Lee Smith BY Hall, Pollock of Vande Sande
ATTORNEYS May 14, 1968    N. A. BOLTON ET AL    3,383,653
MODULAR TRAFFIC SIGNAL CONTROLLER Filed Dec. 21, 1965    11 Sheets-Sheet 11

INVENTORS
Norman Arthur Bolton
Larry Appleman
Terence William Brady
Barry Lee Smith BY Hall, Pollock & Vande Sande
ATTORNEYS

3,383,653
MODULAR TRAFFIC SIGNAL CONTROLLER
Norman A. Bolton, Scottsville, and Larry Appleman, Terence W. Brady, and Barry L. Smith, Rochester, N.Y., assignors to General Signal Corporation, Rochester, N.Y., a corporation of New York
Filed Dec. 21, 1965, Ser. No. 515,388
18 Claims. (Cl. 340—37)

This invention relates to a highway traffic signal controller, and more particularly pertains to a controller which is so constructed and arranged as to comprise a plurality of interconnected and interdependent modules.

A traffic signal controller is commonly provided at each intersection where a plurality of traffic signals is to be controlled to display successively different combinations of signal indications, each different combination generally providing a PROCEED indication to one of several conflicting rights-of-way, while at the same time providing either a STOP or a CAUTION indication to traffic on the remaining rights-of-way. A controller comprises basically an interval register which continually provides an indication representative of the particular interval being timed, a timer for controlling the time that the interval register remains in each of its successive conditions, and means which is responsive to the operated condition of the interval register for controlling the signal lamps to display different combinations of signal indications on the different steps of the register.

Prior mechanical types of controllers have generally comprised a cam switch for the interval register, with associated contacts which are selectively actuated in accordance with the position of the cam switch to selectively control the illumination of the signal lamps, and a dial unit for effecting timing operations. The dial unit generally comprises an electrically-driven, rotating element.

More recently, electronic signal controllers have been proposed such as are disclosed, for example, in the prior application of N. A. Bolton, Serial No. 283,105, filed May 24, 1963, and assigned to the assignee of the present invention. In that prior application, the interval register is shown as comprising an electronic ring counter which is advanced from step to step with the duration of each step being controlled by a common timing means.

Both the mechanical and electronic traffic signal controllers of the past have comprised apparatus which is specifically designed for a particular type of intersection. Thus, there have been developed what are known as two-phase, fixed time controllers, and two-phase, vehicle-actuated controllers. In addition, there have been developed controllers for three or more phases, also each being available as pre-timed controllers or as vehicle-actuated controllers. At complex intersections, it is often necessary to provide for even more than three phases, and this has necessitated the development of even more complex controllers to provide the necessary functions. Often a special type of controller must be used having the capability of being used in a coordinated or progressive signal system. Moreover, such controllers must be so constructed as to be able to provide various auxiliary functions such as the control of pedestrian WALK and DON'T WALK signals or must be capable of being readily modified to make such additional operations possible.

Quite frequently, when traffic lights are first installed at an intersection, the associated controller is one which provides for fixed-time operation of the signals. Often it is found that this is adequate for quite some time, but eventually it frequently becomes necessary to provide for semi-actuated or fully-actuated operation. Thus, if it is found that the relative amounts of traffic on intersecting streets varies quite appreciably at different times of day so that a fixed time schedule will not adequately handle the traffic load, it then becomes desirable to provide for vehicle-actuated operation so that the time accorded each phase will be at least approximately in accordance with the amount of traffic on the corresponding approach to the intersection. In the past, this has always necessitated the removal of the fixed time controller and its substitution with a semi-actuated or fully-actuated controller, together with the necessary vehicle detection apparatus such as treadles, ultrasonic detectors, or the like. In addition, it may later be considered desirable to provide for pedestrian signals, or the nature of the intersection itself may change so that it becomes desirable to have a three-phase controller where a two-phase controller was previously satisfactory. In each case, a change in the mode of operation of the signal system at the intersection has in the past ordinarily necessitated the removal of the old controller and its substitution with a new controller which is specifically designed to meet the requirements of the operation planned for that intersection. This usually necessitates the purchase of a new, more complex, and thus more costly controller, while at the same time rendering obsolete the controller which was replaced. In addition, it is required that the traffic engineering department maintain in stock a large inventory of many different types of controllers in order that there shall be equipment available for repacing any malfunctioning apparatus.

Described briefly, it is contemplated by the present invention to provide a traffic signal controller which is constructed of a plurality of individual modules, each constructed to perform a specific function, and with the modules being readily interconnected in a large number of different combinations, each combination corresponding to a specific type of controller and each thus adapted to meet the requirements of a specific intersection. By means of this invention, it is possible to install a plurality of modules to form, for example, a simple, two-phase, pre-timed controller and then subsequently modify this controller by the addition of only one module so as to convert its operation to that of a two-phase, fully-actuated or semi-actuated controller, whichever is desired. By means of the modular system of this invention, it also becomes possible to add additional phases by coupling to the modules of the two-phase, pre-timed controller one or more additional modules so that, for example, a two-phase, pre-timed controller can readily be converted to a four or five-phase pre-timed controller, or, by the addition of a computer module, to a semi-actuated or fully-actuated three, four, five, or six-phase computer, depending upon the complexity desired.

It is further contemplated by the present invention that the alteration of any controller functions by the addition of modules shall not require any wiring between modules and will merely require that the two modules be brought into juxtaposition, whereby the mating of male and female plug couplers on respective modules will effect all necessary connections between the two and will, moreover, completely alter the mode of operation so as to accommodate it to the additional modules of the system. As one example, taking again the case of the two-phase, pre-timed signal controller, it then becomes possible by the mere juxtaposition of a computer module relative to the signal control module of the basic controller combination, to automatically convert the operation from that of a two-phase, pre-timed controller to a two-phase, semi-actuated controller. As another instance, where the basic controller comprises a three-phase, pre-timed controller, it becomes possible, by the modular controller construction of the present invention, to convert the controller to five-phase operation by merely mounting a two-phase signal control module in juxtaposition to the module which provides for three-phase operation. It will thus be seen that any of a large number of combinations of apparatus may be provided by different combinations of modules, and in each case the change is effected within a few minutes by merely removing a jumper plug module, adding and/or subtracting one or more modules to the stack of modules already provided, and reinserting the plug coupler module on top of the stacked modules. From this it can be seen that a great flexibility of arrangements is provided, equipment obsolescence is greatly reduced, and it is possible to provide for repair and replacement of apparatus with only a small inventory of different types of modules.

Described briefly, the modular controller apparatus of this invention comprises two basic modules which appear respectively at the opposite ends of a stack of one or more optionally selectable modules, the selection of which is based upon the mode of controller operation desired. The two basic modules comprise a power supply and timer for one of the basic modules, and a jumper plug for the other. The function of the power supply and timer module is to provide power at the proper voltages for operation of the circuits of all the modules as well as square wave direct current for the operation of traffic signals which are intended to provide a flashing signal indication. In addition, the power supply and timer module provides a common timing function for all the modules. The jumper plug module is provided to establish interconnections between buses which extend in the direction of stacking of adjacent modules from one module to the next throughout the stack, and the jumper plug module is always provided at the extreme opposite end of such stack from the timer and power supply to provide desired interconnections and thus, in effect, indicate that no additional modules are present in the stack. In between the timer and power supply module and the jumper plug module, numerous combinations of modules or single modules can be interposed according to the mode of operation desired.

A plurality of buses extend through each module, terminating in a plurality of male connectors at one boundary and a corresponding plurality of female terminals at the directly opposite boundary. When two modules are juxtaposed, the male terminals on one module mate automatically with the corresponding female terminals on the adjacent module, thereby automatically interconnecting the buses of one module to that of the next, thereby, in effect, providing a plurality of buses which extend throughout the entire stack of modules.

It has already been described that an interval register is provided for each controller, and the modular controller of the present invention provides that the interval register included therein shall operate from one step to the next throughout a cycle of operation. The interval register employed herein is essentially of the ring counter type; therefore, upon completion of a cycle of operation for the interval register demarcating the steps of a signal cycle, the interval register has been operated back to its initial condition.

If it is assumed that the controller is organized to operate as a two-phase controller, but is then to be modified to operate as, for example, a four-phase controller by the addition of an additional two-phase signal control module, it will be apparent that the circuit organization of the interval register used initially for two-phase operation must be substantially altered not only by the addition of additional steps to make possible the demarcation of the intervals for the additional two phases, but also by interrupting the normal cyclical operation of the two-phase interval register and providing for the insertion of the added steps for the additional phase at the proper place in the original two-phase cycle. This is accomplished by providing connections from the interval register for the original two-phase signal control module to appropriate through buses of that module. When the controller is operated simply as a two-phase controller, the aforementioned buses are jumpered together by the jumper plug module which is placed in juxtaposition to the two-phase signal control module; however, when the controller is to be converted to four-phase operation, the jumper plug is removed, thereby opening the jumper connection between the aforementioned buses and instead these buses are connected to corresponding buses in the second two-phase signal control module. In such second module, appropriate connections are made from such buses to the interval register steps therein, enabling those steps to be incorporated into a now larger interval register having appropriate steps for four-phase operation.

If still additional signal control modules are used to provide for additional phases in the signal cycle, each additional module employed comprises interval register steps for timing the intervals of the additional phases, and the circuit organization is so arranged that the mere coupling of the additional module or modules, as the case may be, to those already in the stack will automatically incorporate the interval register steps of the added module to those already employed. Of course, all of the related functions concerned with the additional phases are also automatically brought into operation by the addition of the added module units such as those which provide for the timing of the various steps of the interval register and the control of the various units which provide for the control of the signal lamps.

The conversion of a pre-timed controller to a vehicle-actuated controller may be made by the simple addition of a computer module to the stack of modules which, in combination, form the pre-timed controller. The insertion of the computer module automatically results in the conversion of the operation of certain steps of the interval register from fixed time operation to a timing operation which is a function of the number of vehicles detected. This is accomplished by the automatic routing of selected electrical connections from the interval register for the signal control module to corresponding buses which extend from one module to the next, thereby making possible the routing of such connections to the computer module wherein various circuits are provided to effect signal control as a function of the amount of traffic detected.

It is a feature of the invention to provide a modular controller which is of the electronic type, employing no moving parts whatsoever. The controller of the present invention employs printed circuit boards, with a plurality of such boards being plug coupled, in each module, into what is commonly known as a "mother board." The mother board includes the various buses which extend from one module to the next, and the plug coupling of any circuit board into the mother board not only automatically provides for the selective making of connections to the various buses but also makes possible the completion of circuit connections from one of the circuit boards to the next by means of printed circuit connections which extend generally transverse to the aforementioned buses.

It is thus an object of the present invention to provide a modular traffic signal controller system comprising a plurality of interconnected modules, each of which is designed to perform the specific functions of a portion of a complete controller.

It is another object of the invention to provide a modular signal control system in which the various modules are interconnected by merely being placed in juxtaposition with each other and where the resultant plug coupling of interconnected modules automatically converts the system from one mode of operation to the next without requiring that any additional internal circuit connections be altered.

It is a further object of the present invention to provide a modular traffic signal controller system which comprises modules providing, respectively, for two-phase and three-phase signal control, thereby making possible, upon the combination of various number of two-phase and three-phase modules, a composite controller having any desired number of phases.

It is an additional object of the invention to provide a modular traffic signal controller having a basic module for either two-phase or three-phase operation which ordinarily operates in a fixed time mode but is capable, upon the coupling thereto of a computer module, to convert its operation to the vehicle-actuated mode, either semi-actuated, or fully actuated.

Other objects and purposes of the invention are apparent from the drawings and others will become apparent as the description of the invention progresses.

Figure 3A:
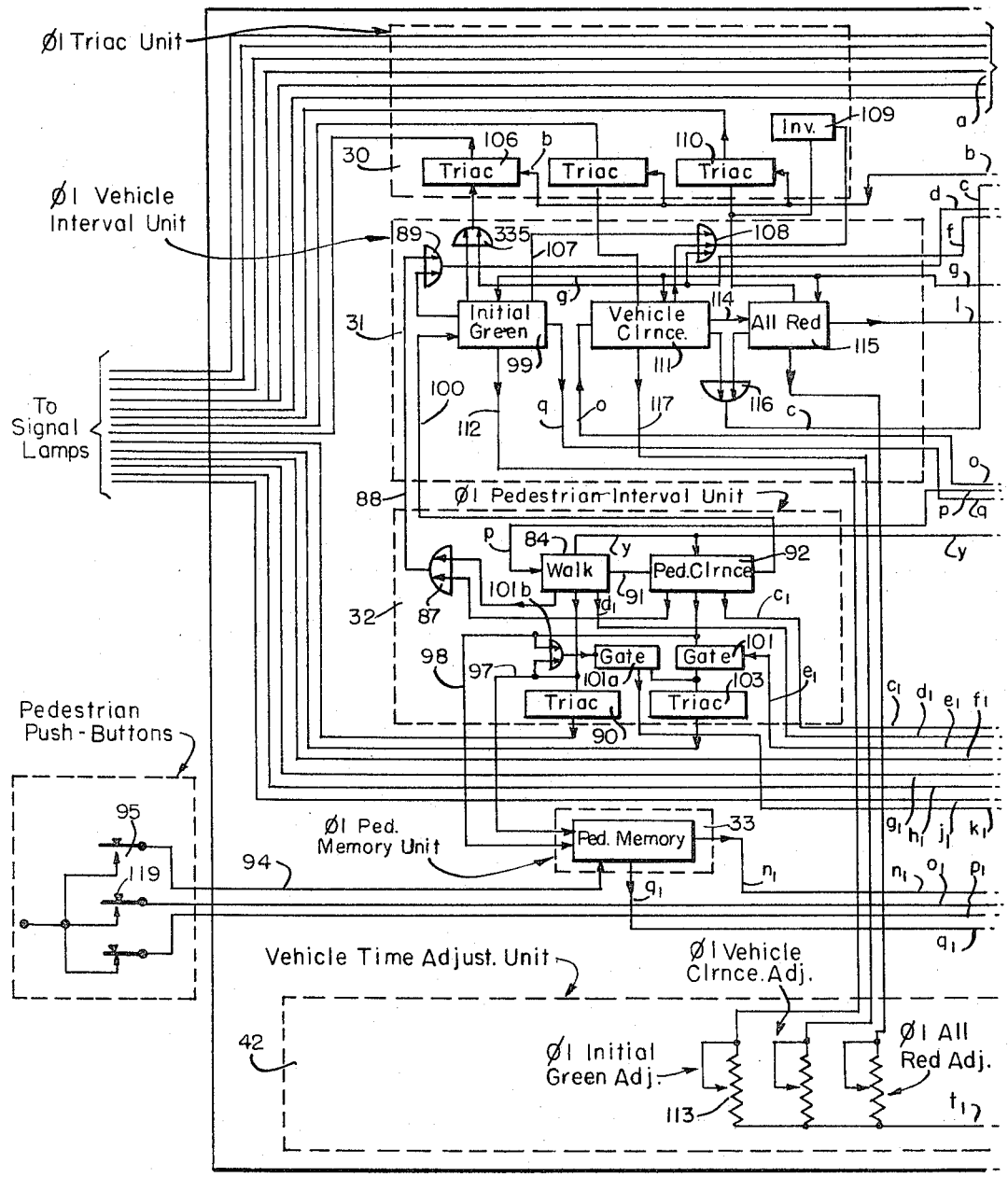
Figure 3B:
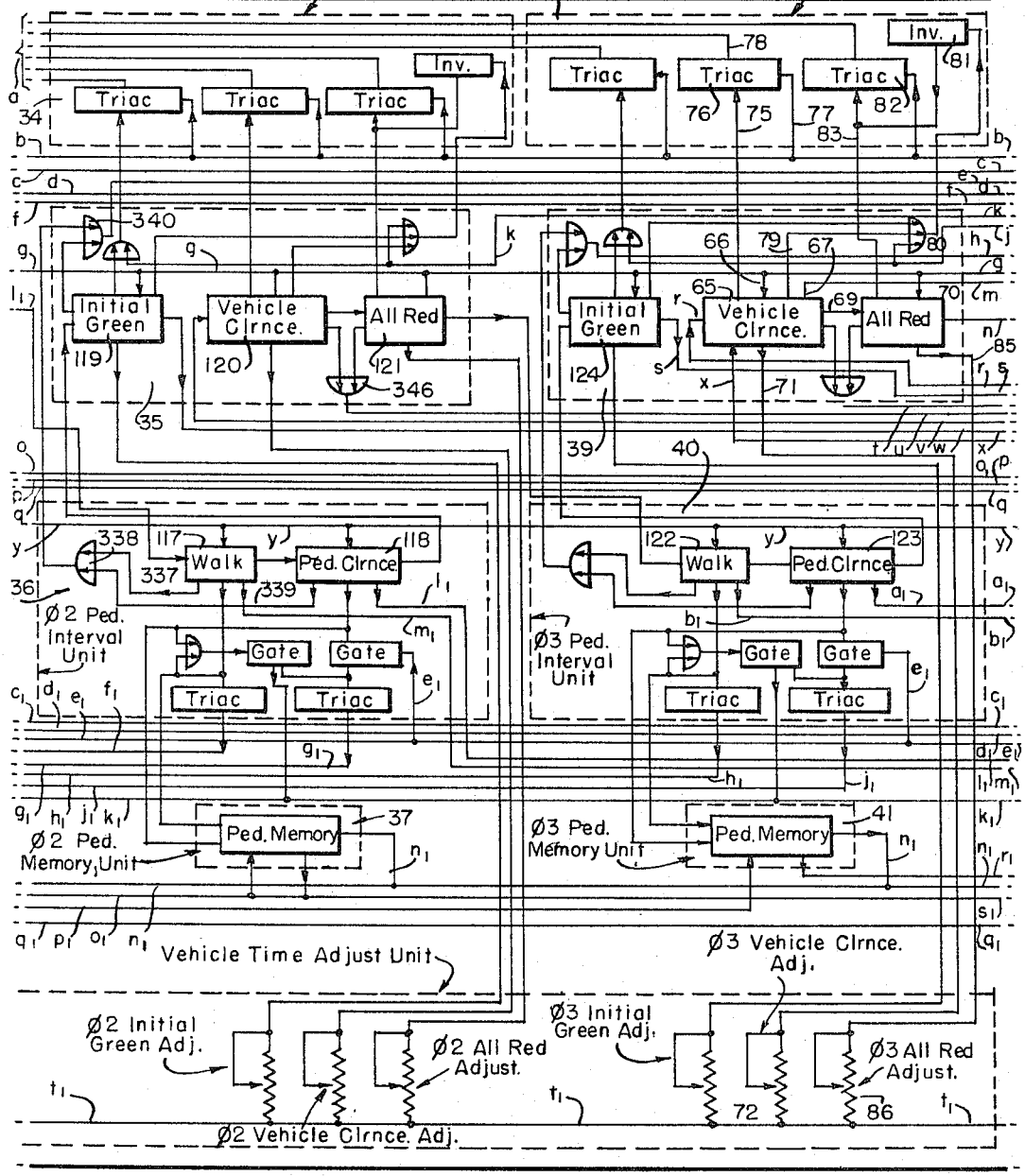
Figure 3C:
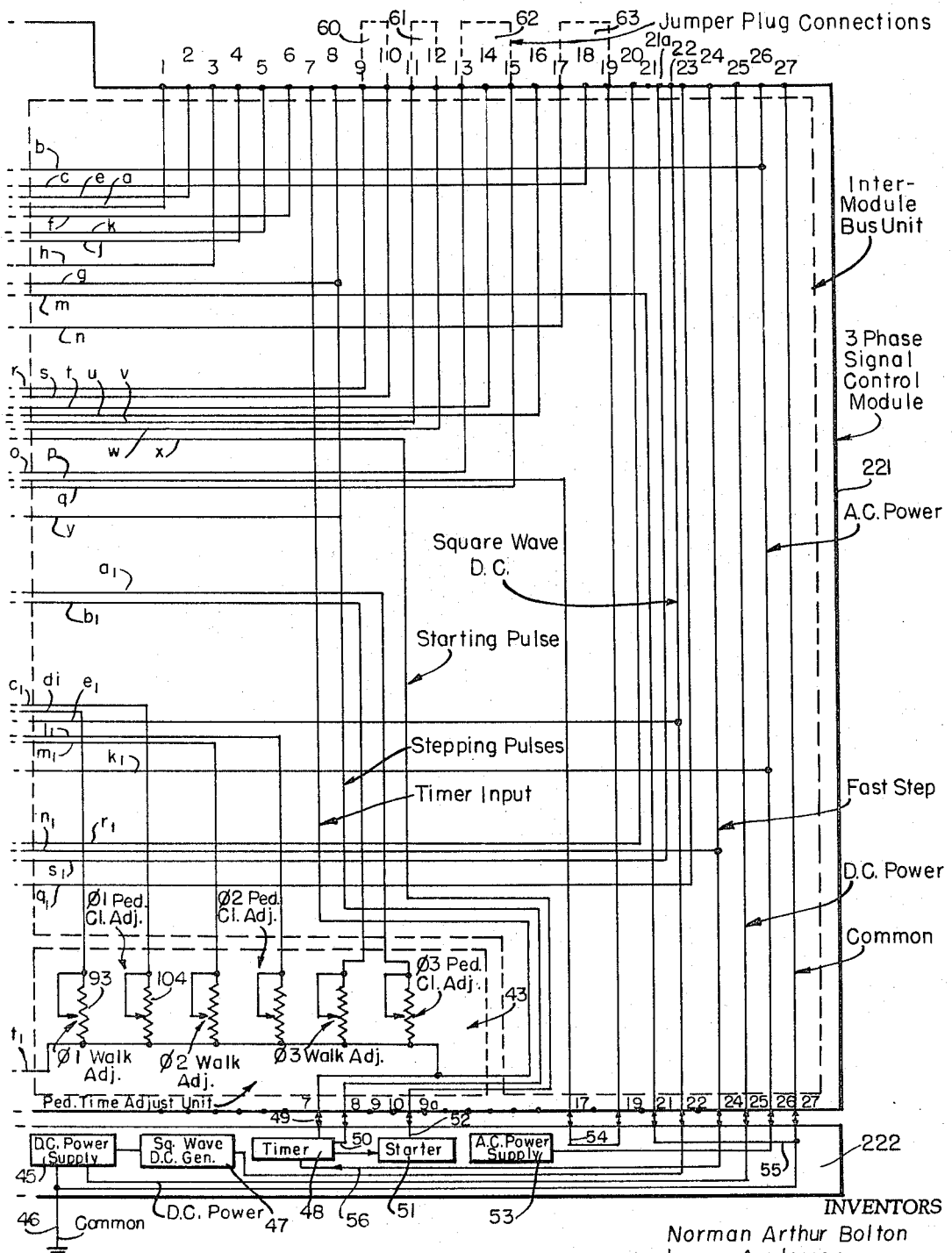
Figure 4A:
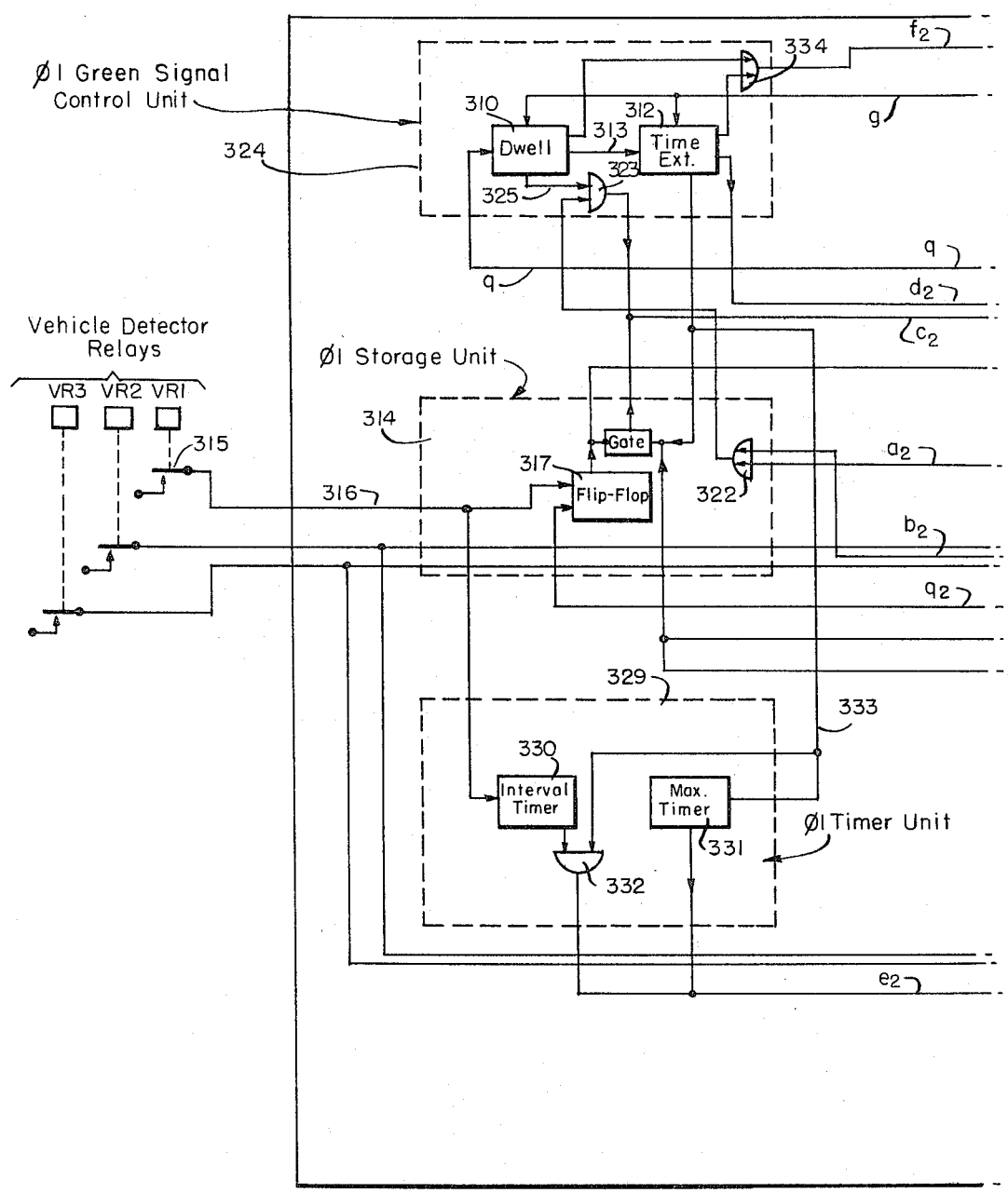
Figure 4B:
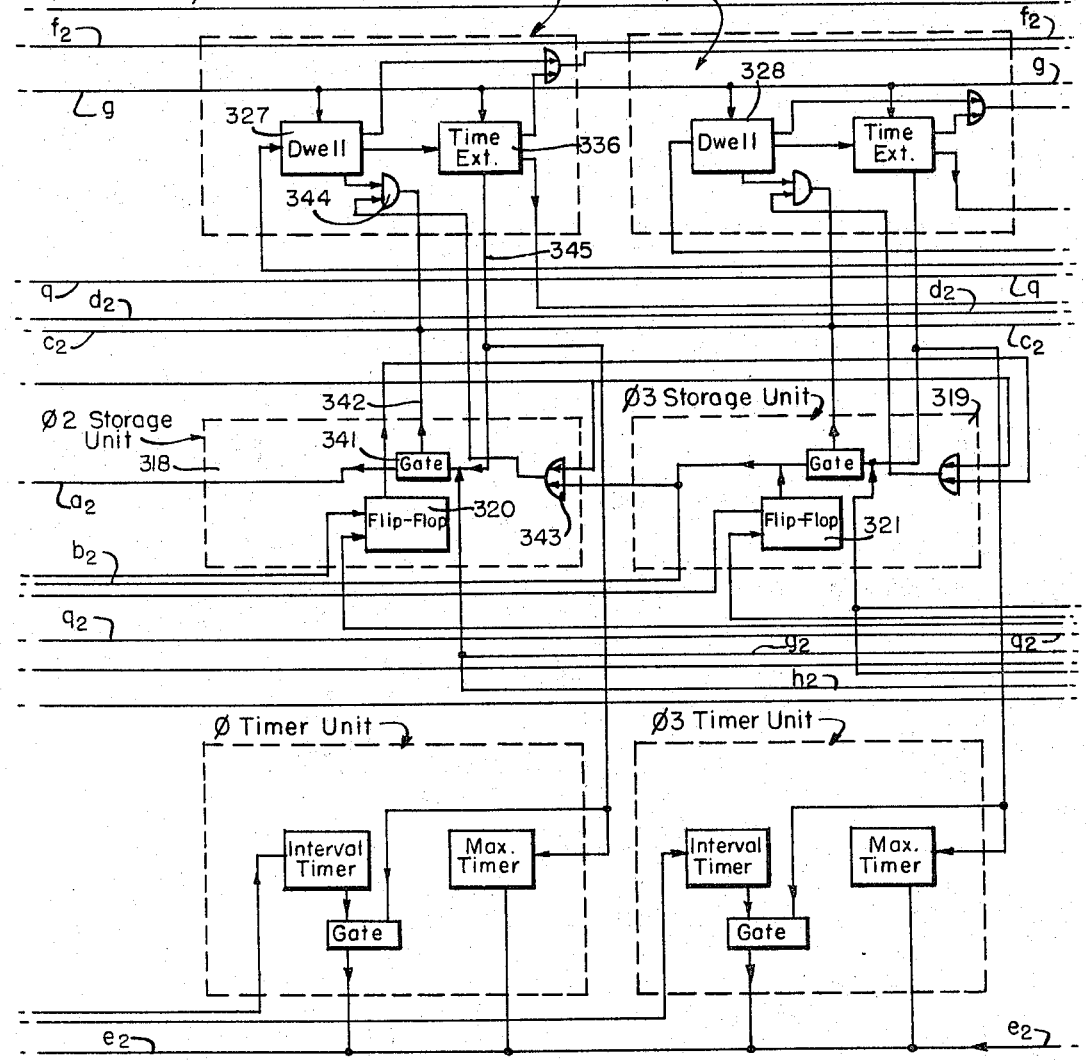
Figure 4C:
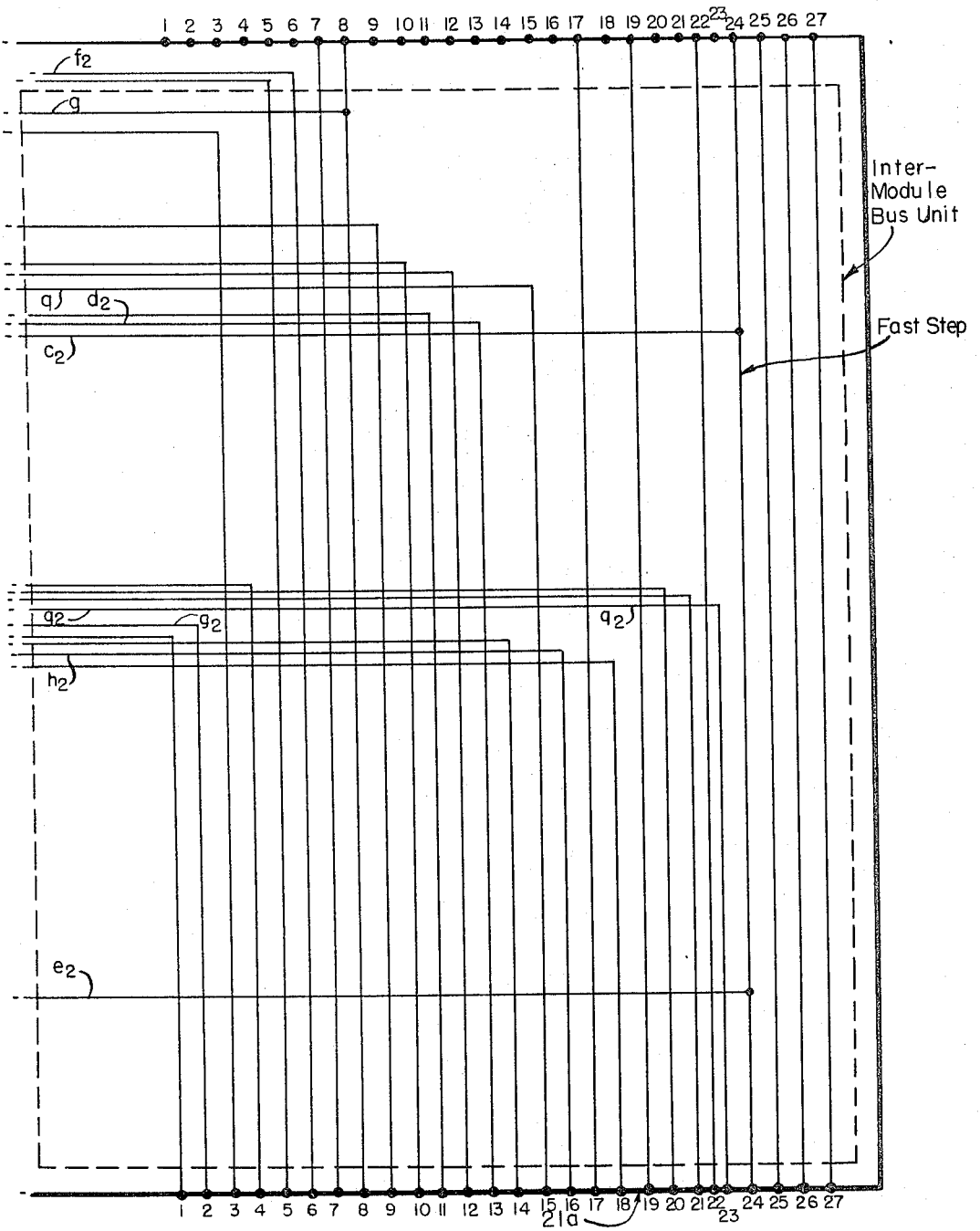
Figure 5A:
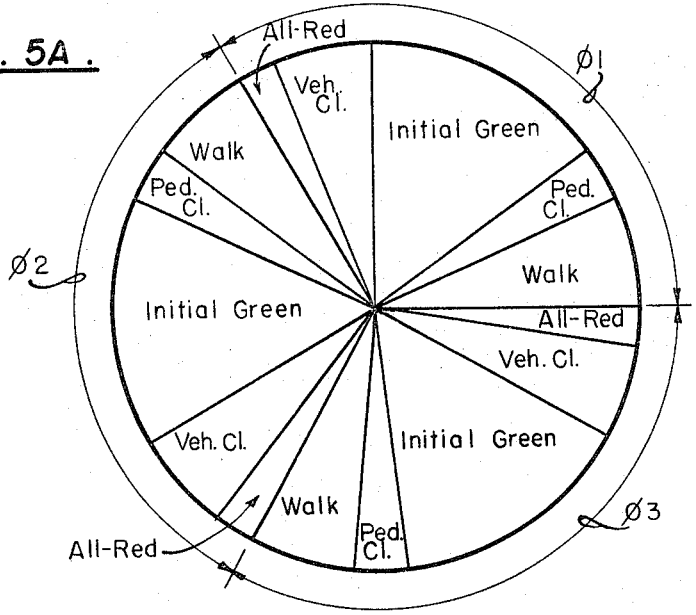
Figure 5B:
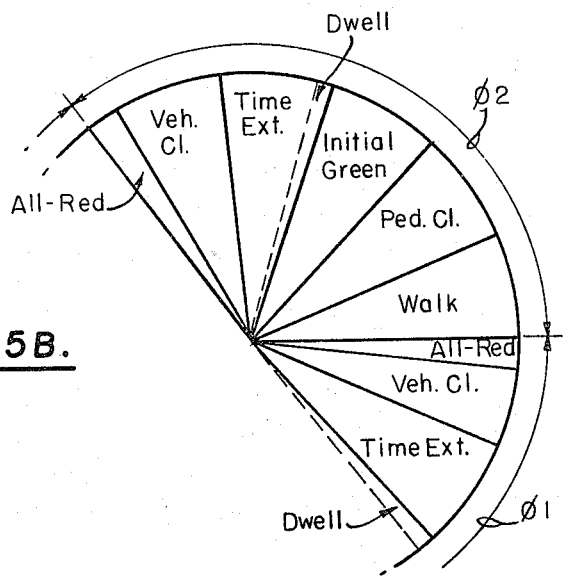
Figure 6:
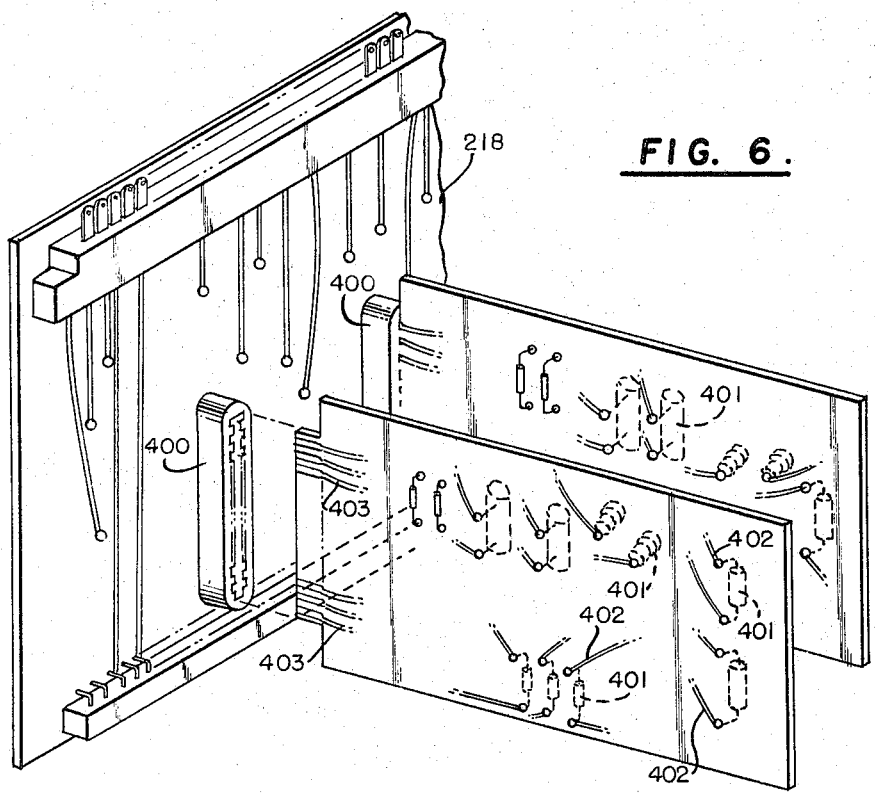
Figure 6A:
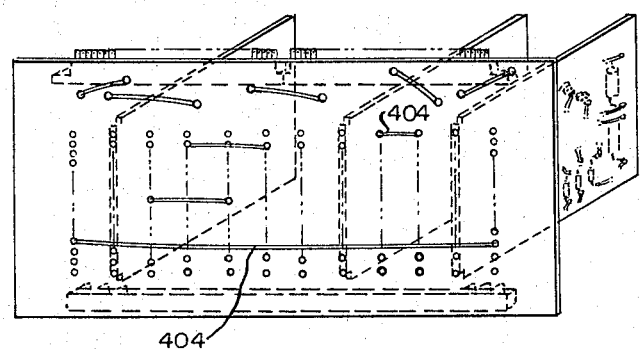

In describing the invention, reference will be made to the accompanying drawings in which corresponding reference characters designate corresponding parts and in which:

FIG. 1 is a perspective view of a plurality of modules illustrating particularly how the modules may be plug coupled together to provide thereby a stacking of a plurality of modules so as to comprise a complete controller;

FIGS. 2A–2E comprise block diagrams illustrating how various modules may be coupled together to provide different types of traffic signal controllers;

FIGS. 3A–3C, when placed side by side, illustrate a block diagram for a typical three-phase signal control module and also illustrate in block diagram form the timer and power supply module which is common to all the modules of the controller and further illustrate the circuit connections provided by a jumper plug module;

FIGS. 4A–4C, when placed side by side, illustrate in block diagram form a typical fully-acuated computer module;

FIGS. 5A and 5B each comprise polar diagrams which demonstrate graphically the sequence of operations of a three-phase, fixed time controller and a vehicle-actuated controller; and FIGS. 6 and 6A illustrate, in part, the physical arangement of the various component parts of the typical module.

FIG. 1 illustrates in perspective the three modules which may be coupled together to provide a three-phase, fixed time controller. The three modules comprise a timer and power supply module 222, a three-phase signal control module 221, and a jumper plug module 212. Although these modules are shown as separated to aid in illustrating each of the individual modules, it is to be understood that, in practice, the three modules are placed in close juxtaposition to thereby permit automatic plug coupling of various contacts of one module to the next. Thus, it will be noted that the upper panel 213 of the timer and power supply module 222 is generally a flat surface except that apertures are provided therein at 214 and 215 through which extend various male plug coupling contacts. In the bottom surface 216 of the three-phase signal control module 221 there are similar apertures which surround female plug coupling elements, thereby permitting a connection to be made from each male contact of the module 222 to a corresponding female contact in the module 221. In a similar manner, male contact members 217 protrude from the upper surface of module 221 and are adapted to couple to mating female contact members on the bottom surface of jumper plug module 212.

As will be apparent, as the description progresses, a combination or stack of modules to comprise a particular type of traffic signal controller always includes a timer and power supply module 222 and a jumper plug module 212, and between these two units may be inserted one or more of various different types of modules as exemplified in FIG. 1 by the three-phase signal control module 221. The particular combination of modules shown in FIG. 1 results in a signal controller which is a three-phase, pre-timed controller. Several of the different available modules will later be described, and there will also be described the various combinations of controller operations which result from the use of different combinations of modules.

Each module includes a printed circuit mother board on which are etched the buses which extend from one module to the next and which are plug coupled between modules. A typical one of these mother boards is illustrated in FIG. 1 at the cut-away portion of the module 221 at 218. Various circuit boards such as 219 and 220 are plug coupled into the mother board 218 in a manner which will be disclosed in greater detail subsequently. Although not shown in FIG. 1, the timer and power supply module 222 is provided with a similar mother board. The mother board buses in module 222 are connected to various power sources, and the inter-modular plug coupling of corresponding buses in the various modules makes it possible to supply power to each module in the stack. Also, it is possible in each module to connect, for example, to an appropriate bus in that module and over corresponding buses in intervening modules, if any, to a common timing circuit in module 222. The timer output similarly is applied to a particular bus in module 222 and is then automatically made available in each module in the stack by reason of its having a corresponding mother board bus which is plug coupled to the designated bus in module 222.

The physical arrangement of the mother board 218 and circuit boards is illustrated in FIGS. 6 and 6A. Mother board 218 has a plurality of plug connectors 400 fastened thereto, and each is adapted to receive a circuit board such as 219. On each circuit board are mounted a plurality of electrical components such as those indicated at 401. These are mounted on the back side of each board and are, accordingly, shown in dotted line. Various electrical interconnections between such components is provided by etched circuit conductors which are shown at 402, on the rear surface of the board. Connections between any conductor or a circuit board and a mother board bus are made by means of etched conductors at 403 which make electrical contact with respective contacts on the mating contactor 400. Connections between different circuit boards are made by a circuit path extending from a selected circuit board conductor, through the respective contact on a contactor 400 to an associated mother board conductor and thence to an appropriate other mother board conductor by means of a transverse lead on back of the mother board (see conductors 404 in FIG. 6A). From there, connection is made to a corresponding contact on a different one of the contactors and thence through such contact to a selected contact on the particular circuit board which mates with such different contactor.

The jumper plug module, as previously described, establishes predetermined circuit connections between selected mother board buses, thereby, in effect, establishing that there are no additional modules in the controller beyond the jumper plug and that the immediately adjacent module, such as module 221 in FIG. 1, is indeed the topmost module in the stack.

DESCRIPTION OF SIGNAL CONTROL MODULE—
FIGS. 3A–3C

FIGS. 3A, 3B, and 3C, when placed side by side, comprise a block diagram of a three-position, pre-timed modular controller constructed in accordance with the present invention. FIG. 3C comprises for the most part a representation of the intermodule bus unit or "mother board" utilized in the controller; and this mother board includes a top connector (represented by terminals 1 through 27, inclusive), a bottom connector having a like series of terminals (only some of which have been given numerals), and a series of printed circuit buses extending between certain top and bottom terminals in vertical directions, as well as further buses extending from others of said top or bottom terminals in vertical directions only partially across the mother board to plug type receptacles mounted on said mother board adapted to receive circuit boards having various circuits thereon. The horizontal buses shown in FIGS. 3A–3C are intended, for the most part, to represent connections between such circuit boards and between individual circuit boards and buses on the mother board; and the interrelationship of these horizontal buses (or of the electrical connections represented thereby) to the circuits will become more readily apparent as the description of FIG. 3 proceeds.

The overall modular unit, being designed for three-phase operation, has control units associated with each of said three phases. The units associated with phase 1 of the controller are shown on FIG. 3A and comprise a Phase 1 Triac unit 30, a Phase 2 Vehicle Interval Unit 31, a Phase 1 Pedestrian Interval Unit 32, and a Phase 1 Pedestrian Memory Unit 33. Each of the units 30, 31, 32 and 33 has been segregated from the other units by broken lines, and each of said units can, in accordance with one embodiment of the present invention, comprise circuits mounted on an individual circuit board adapted to be plugged into one of the receptacles mentioned previously and mounted on the mother board.

Similar such units are provided in the controller for both phase 2 and phase 3. More particularly, phase 2 includes a Triac Unit 34, a Vehicle Interval Unit 35, a Pedestrian Interval Unit 36, and a Pedestrian Memory Unit 37; whereas, the phase 3 control portions of the modular controller include a further Triac unit 38, a Vehicle Interval Unit 39, a Pedestrian Interval Unit 40, and a Pedestrian Memory Unit 41. The several units thus shown on FIGS. 3A, 3B and 3C are interconnected to one another, and to appropriate ones of the upper and/or lower connectors of the mother board, by connections which have been represented as $a$ through $y$, inclusive, and $a_1$ through $t_1$, inclusive. These letter designations appear adjacent the vertical edges of FIGS. 3A, 3B and 3C to facilitate relating the partial schematics of these several sheets of drawings to one another.

The control portions thus far generally described are located within a single chassis comprising one module of the overall modular controller. The front panel of this module includes a vehicle time adjusting unit 42 (see FIGS. 3A and 3B) for adjusting the timing operations for the various vehicle interval stages of phases 1, 2 and 3 of the modular controller; and the front panel of said module further includes a pedestrian time adjusting unit 43 for adjusting the timing of the various pedestrian interval units (WALK and Pedestrian Clearance) of phases 1, 2 and 3. The operation of these time adjusting units will become apparent as the description proceeds. FIG. 1, incidentally, shows the control knobs which are on the front panel of the signal control module and permit adjustment of the various pretimed steps.

The signal control module thus far described in reference to FIGS. 3A, 3B and 3C is further associated with a timer and power supply module 222 illustrated across the bottom of each of FIGS. 3A, 3B and 3C. This timer and power supply module 222 includes a DC Power Supply 45 having a grounded connection at 46; a Square Wave DC Generator 47; a Timer 48 comprising a pulse generator adapted to be triggered by a signal at its input 49 and adapted, in response to such triggering, to produce an output at terminal 50; a starter unit 51 adapted to be triggered by the timer unit 48 and arranged to produce an output pulse at terminal 52; and an AC power supply 53.

The timer and power supply module 222 comprises a separate chassis having a plug type connector at its upper surface mating with a corresponding plug connector at the lower portion of the signal control module. When the signal control module is plugged into the timer and power supply module, therefore, various of the vertical buses mentioned previously are electrically connected to circuits within the timer and power supply module 222.

More particularly, it will be seen that bus 7 of the signal control module is connected to terminal 49 of the timer unit 48. Bus 8 of the modular controller is connected to terminal 50 of the timer unit 48. Bus 9a of module 221 is connected to terminal 52 of starter 51, and bus 17 is connected to a jumper 54 located within the timer and power supply which connects terminals 17 and 19. Bus 21 of module 221 is connected to a further jumper 55 leading to a line coupled to the common or ground connection 46 of the timer and power supply. Bus 22 of module 221 is connected to the output of the square wave DC generator 47, and bus 24 is connected to a line 56 in the timer and power supply adapted to fast step the timer unit 48. Bus 25 of module 221 is coupled to the output of the DC power supply 45. Bus 26 is connected to the output of the AC power supply 53, and bus 27 is connected to the grounded or common terminal 46 of the timer and power supply module. By reason of these connections, effected when the signal control module 221 is plugged into the timer and power supply module 222, therefore, various of the buses on the mother board will have power applied thereto, various of the other buses will properly be connected to input and output terminals of the power and pulse sources in the timer and power supply module, and still others of the buses will be interconnected to one another by reason of internal connections within the timer and power supply module.

In addition to the units thus far described, means are provided for interconnecting selected ones of the terminals on the top connector plug of the modular controller. When the three-phase modular controller illustrated in FIGS. 3A through 3C, inclusive, is to be used without further signal control or computer modules, these interconnecting means comprise a jumper plug having terminals adapted to mate with terminals on the top connector of the topmost module in the stack. This jumper plug has been diagrammatically illustrated in FIG. 3C by broken line jumpers 60, 61, 62 and 63, interconnecting terminals 9 and 10, 11 and 12, 13 and 15, and 17 and 19, respectively, at the top connector of the three-phase modular controller. A broken line representation has been adapted for the jumpers 60 through 63, inclusive, since it is entirely possible that the actual unit connected to the top connector of a particular modular controller may comprise a still further signal control module or a computer unit e.g. the top terminals 1 through 27, inclusive, shown on FIG. 3C may mate with the bottom connector terminals of a further three-phase modular controller, or with the bottom terminals of a further two-phase modular controller, or with the bottom terminals of a computer unit, physically plugged onto the top of the signal control module actually shown in FIGS. 3A through 3C. Whatever the array of modular units, however, the uppermost such unit will be topped by a jpumper plug providing the connections 60 through 63, inclusive.

The interconnection of the various circuits shown on FIGS. 3A through 3C, inclusive, and the nature of the control components used to form these circuits, will be most readily understood by considering the operation of the circuit as a whole. In this connection, reference may be made to FIG. 5A which illustrates, by way of a polar diagram, the various sequential intervals of a typical three-phase cycle. The description of system operation will be best understood by starting with the Vehicle Clearance step 65 in phase three of the signal control module (FIG. 3B). This Vehicle Clearance stage, and the various other stages to be described hereinafter in the Vehicle Interval and Pedestrian Interval units each comprises a bistable state device adapted to be selectively triggered into operation. It is contemplated, for example, that a silicon controlled switch may be used for each step as disclosed, for example, in the copending application of N. A. Bolton and J. H. Auer, Jr., Ser. No. 283,105, filed May 24, 1963. The triggering operation, in accordance with the embodiment of the present invention shown in FIG. 3, preferably requires two input signals i.e. a gating signal and a stepping pulse signal, and these two signals must occur jointly before any particular bistable stage can be triggered into operation. As a general matter, stepping pulses are applied simultaneously to each step in the interval register, including both the steps in the various Vehicle Interval Units and those in the Pedestrian Interval units, these stepping pulses appearing on bus 8 of the mother board, which bus is coupled to the output 50 of timer unit 48, and interconnected by line $g$ and $y$ to a stepping pulse input terminal of each interval register step. The gating input to any particular step is derived from the output of a preceding step, whereby operation of any particular step produces a gating signal output which conditions the next subsequent stage for operation upon occurrence of the next subsequent stepping pulse.

Returning to Vehicle Clearance step 65 in phase 3 of the modular unit, a gating input is normally received on line $r$, when the immediately preceding step, Initial Green 124, is operated; whereas a stepping input may be received from line $g$ at step input 66. While, under normal circumstances, the joint application of signals on lines $r$ and 66 would trigger a step such as 65 into operation, this does not occur in the case of stage 65 due to a connection 67 extending from stage 65 through line $m$ to bus 21 in the modules 221 and 222, with a further connection being made via jumper 55 to the common or ground connection 46 in the timer and power supply module 222. This particular connection, it will be noted, is supplied only to the Vehicle Clearance step 65 in the phase 3 portion of the signal control module. Moreover, it will be noted that this connection to the phase 3 Vehicle Clearance step occurs only in a signal control module which is located directly above the module 222, since the connection from bus 21 of module 221 to ground requires the jumper 55 located within module 222. Where several modular controllers are stacked one upon the other, it is only the lowermost signal control module that has its bus 21 grounded in module 222 so as to ground the Vehicle Clearance gating input of its third phase.

The ground connection thus supplied to Vehicle Clearance step 65 at its terminal 67 is so connected to the bistable unit comprising stage 65 as to prevent that stage from being triggered into operation by the concurrence of a gating signal on line $r$ and a stepping pulse on line $g$. In the absence of such a ground connection, the gating signal on line $r$, occurring together with a stepping pulse on terminal 66, would drive the vehicle clearance stage 65 into operation; and accordingly, these joint signals can properly operate the phase 3 Vehicle Clearance stage in signal control modules other than the lowermost such modular controller, when plural signal control modules are stacked one upon the other.

A special starting pulse, provided by starter 51 in module 222 operates to drive Vehicle Clearance step 65 into operation. When starter unit 51 produces a pulse output, this output is coupled from terminal 52 of said starter 51 to bus 9$a$, and over line $x$ (FIG. 3C), whence it passes to an input of Vehicle Clearance step 65 (designated $x$).

When vehicle clearance step 65 is operated in response to this starting pulse, it provides a gating output on line 69 to the input of All Red step 70. Stage 70 will not be driven into conduction, however, since for reasons already explained, operation of stage 70 requires not only the gating signal on line 69, but also requires a stepping signal from line $g$. To provide this, Vehicle Clearance step 65 provides a further output on line 71 which passes to a phase 3 Vehicle Clearance Adjust control 72 located in the Vehicle Time Adjust unit 42. Adjustment unit 72 has been diagrammatically illustrated as a potentiometer. In practice, this adjustment unit, as well as other adjustment units located in the time adjust units 42 and 43 can comprise either a potentiometer alone, or a potentiometer associated with a multiple position switch adapted to give various coarse and fine range resistive adjustments.

The several time adjust units, of which 72 is one example, have their lower terminals connected to a common line $t_1$ which is in turn connected to a timer input bus 7 on the mother board. The lower end of bus 7 is connected to input 49 of timer unit 48, and said timer unit 48 includes a capacitor cooperating with the adjustable resistors connected to line $t_1$ to provide an RC time constant circuit, the actual time constant of which is varied by appropriate adjustment of the resistive element thereof, such as the phase 3 Vehicle Clearance Adjust unit 72.

After a time period which depends upon the adjustment of resistive element 72, an output pulse is produced by timer 48 at its terminal 50. This output pulse is again coupled to the signal control module 221 through the mating plug receptacles at the top of module 222 and at the bottom of module 221, via bus 8. This stepping pulse output of timer unit 48 is applied to each interval register step in the modular controller. However, since only the All Red step 70 has, at this time, a gating input thereto (via line 69) the stepping pulse from bus 66 appearing on line $g$ operates only step 70.

While Vehicle Clearance step 65 is on, and prior to the firing of All Red step 70, the Vehicle Clearance step 65 supplies an output via line 75 to a Triac 76 which further receives AC power from a line 77 coupled to line $b$, which is in turn coupled to an AC power bus 26 connected via the plug receptacle at its lower end to the output of the AC power supply 53 in the module 222. The Triac unit 76 (and the other triac units in the overall modular controller) require joint application of a gating signal (such as at 75) and power (such as at 77) to operate; and accordingly by the arrangement described, when vehicle clearance stage 65 is operating, triac 76 will be energized to provide an output on line 78, comprising one of a group of triac output lines $a$ (see FIGS. 3A and 3B), thereby energizing the yellow signal lamp associated with phase 3.

Operation of the phase 3 Vehicle Clearance step 65 supplies a still further output on line 79 to an OR gate 80, the output of which inhibits a gate 81. A second input to gate 81 is coupled to line $b$ which connects to bus 26 which, in turn, is energized with AC power. In the absence of an inhibit input to gate 81 from OR gate 80, AC power from lead $b$ will be supplied to Triac 82; with Triac 82 additionally receiving an input from the All-Red step 70 when it is on, the red signal lamp controlled by Triac 70 will be energized, whereas the red lamp will be dark whenever step 70 is not operated. It is, of course, also required that the red signal lamp be dark whenever Vehicle Clearance step 65 is operated since, on phase 3, only the yellow signal lamp should then be illuminated. This is accomplished by inhibiting Gate 81 during the Vehicle Clearance step, thereby preventing AC power from being applied to Triac 82. Accordingly, when Vehicle Clearance step 65 is on, Triac 76 is gated on, but Triac 82 receives no AC power.

OR Gate 80 receives a second input from the Initial Green step of phase 3 (to be described) whereby the inhibition described previously occurs also when the signal control module is in phase 3 Initial Green. A third input to gate 80 is derived from line $j$ which is coupled to top terminal 4 in the module 221, and this terminal is employed when the modular controller is associated with a computer (to be described in reference to FIGS. 4A–4C).

The overall arrangement is accordingly such that no power can be supplied to all red Triac 82 when the module 221 is in phase 3 Initial Green, nor when it is in phase 3 Vehicle Clearance; whereas, power is otherwise supplied via gate 81 to the all red Triac 82 under all other conditions. This means that the red signal lamp associated with phase 3 will be illuminated at all times other than phase 3 Initial Green and phase 3 Vehicle Clearance, and will thus be illuminated when the modular controller is in the phase 1 or phase 2 portions of its operation.

Upon operation of the All Red step 70 (described previously) a control signal is supplied to Triac 82 via line 83 to light the red signal lamp associated with phase 3. The all red stage 70 of phase 3 further supplies a gating output on line $n$ which extends to the vertical bus connected to bus 17 on the mother board. If the signal control module shown in FIG. 3 were superposed by another signal control module, the gating signal thus supplied by stage 70 would pass to the next adjacent signal control module to condition a stage in said super-adjacent modular controller, and this operation will be described subsequently.

For purposes of the present description, however, let us assume that we are concerned only with three-phase operation, and let us further assume that the module 221 shown in FIG. 3 represents the only signal control module employed, in which event it would be topped by a jumper plug which includes jumper 63. The gating output from All-Red Step 70 would therefore pass from bus 17 through jumper 63 to bus 19, would then pass downwardly to a bottom terminal associated with bus 19, would then be jumpered by means of jumper 54 through the timer and power supply module 222 to bus 17, and then would pass upwardly to line $p$ which is in turn connected to a gating input of phase 1 WALK step 84.

A second output from All-Red step 70 passes downwardly via line 85 to the phase 3 All Red Adjust potentiometer 86, whence it is coupled via line $t_1$, and timing bus 7, to timer unit 48. After an appropriate time interval determined by the setting of potentiometer 86, timer unit 48 supplies another stepping output which is coupled from terminal 50 thereof to bus 8. This stepping pulse is now coupled via line $y$ in module 221 to the stepping input of phase 1 WALK step 84, causing said step to operate.

One output from WALK step 84 is coupled to an OR gate 87, then via line 88 to a further OR gate 89, and thence via line $d$ to upper terminal 1 on the mother board. This coupling is utilized when a computer is associated with the modular controller, and will be described later. A second output from the WALK step 84 is coupled to the phase 1 WALK Triac 90, which Triac further receives power via line $k_1$ from the AC power bus 26 of the mother board, thereby energizing the WALK signal for phase 1. Another output from the WALK step 84 is coupled via line 91 as a gating input to the Pedestrian Clearance step 92 of phase 1. A still further output from the WALK step 84 is coupled via line $d_1$ to the phase 1 WALK adjust potentiometer 93 (FIG. 3C), whence the signal is coupled via line $t_1$ and timing bus 7 to timer 48 in the module 222. After an appropriate time interval set by the adjustment of potentiometer 93, therefore, timer 48 will supply a stepping pulse output via bus 8 to line $y$ and thence to the Pedestrian Clearance step 92 of phase 1, to operate said step 92.

Under some circumstances, it may be highly desirable to skip the WALK and Pedestrian Clearance steps unless pedestrians are actually available and desirous of crossing. In order to effect a control of this type, each phase includes a pedestrian memory unit, with the pedestrian memory unit 33 being associated with phase 1. Pedestrian memory unit 33 includes one input coupled via a line 94 to a pedestrian pushbutton 95 associated with phase 1. Actuation of pushbutton 95 by a pedestrian will store a call in the pedestrian memory 33. Pedestrian memory 33 comprises a logic unit so arranged that, in the absence of a stored call therein, an input to the pedestrian memory unit will produce an output on line $n_1$ which output is coupled to fast step bus 24 on the mother board. Pedestrian memory 33 includes a further output coupled via line $q_1$ to bus 23 on the mother board, and this particular connection is used when the signal control module is associated with a computer module, as will be described.

The WALK step 84, for the reasons described, accordingly includes an output line 97 which is supplied to the pedestrian memory 33, and which checks to determine whether a pedestrian call has been earlier stored in the memory 33 by actuation of switch 95 associated with phase 1. In the event that such a pedestrian call has been stored, no output will appear on line $n_1$, and the controller will time through the phase 1 WALK stage in the manner already described. If, however, the input to the pedestrian memory 33, via line 97, finds no call stored in the pedestrian memory, an output will immediately appear on line $n_1$, and this signal will be coupled via the fast step bus 24 to the timer 48. Timer 48 will, accordingly, immediately produce a stepping pulse output which is coupled via bus 8 to line $y$, and thence to the stepping input of pedestrian clearance stage 92 so that the module 221 will immediately go into phase 1 Pedestrian Clearance. One of the outputs from Pedestrian Clearance stage 92 will then be coupled via line 98 to the input of the pedestrian memory 33; and since, under the conditions here assumed, no pedestrian call has been stored in the memory 33, a further fast step output will immediately be produced via line $n_1$, fast step bus 24, timer 48, and stepping bus 8, to provide a stepping pulse on line $g$. This stepping pulse is applied, inter alia, to phase 1 Initial Green step 99, which in turn receives a gating output via line 100 from the output of the phase 1 Pedestrian Clearance step, whereby the controller will immediately step into phase 1 Initial Green.

In the absence of a pedestrian call on phase 1, therefore, the modular controller operates, as described, to step from phase 3 All-Red into phase 1 Initial Green, with the intervening operations of phase 1 WALK and phase 1 Pedestrian Clearance being fast stepped at such a rate as to effectively eliminate them from the cycle of operation since these steps each remain operated for such a short time that the associated signal lamp cannot give a signal indication.

If we assume that a pedestrian call has come in on phase 1, the fast stepping operation described previously will not occur on either phase 1 WALK (already described) or on phase 1 Pedestrian Clearance. Instead, each of these steps will then be tuned in accordance with the setting of its corresponding potentiometer included in the pedestrian time adjust unit.

One output from the Pedestrian Clearance step 92 of phase 1, when placed into operation, supplies an enabling input to a gate 101, a second input to which gate comes from line $e_1$. Line $e_1$ is coupled to a bus 22 connected to the output of square wave DC generator 47 in the timer and power supply module 222. Accordingly, pulsating DC power is coupled via gate 101 to Triac 103 to provide a flashing DONT WALK signal corresponding to phase 1 Pedestrian Clearance. Unlike the other triac units previously described, which require a gating input to control the application of AC power to an associated signal lamp, those which control a DONT WALK signal, such as Triac 103, have their enabling gate permanently biased to provide a steady gating control. Thus, it is only necessary to selectively apply AC energy thereto in order to energize the associated DONT WALK signal.

When the interval register is on any step other than phase 1 WALK or phase 1 Pedestrian Clearance, the DONT WALK signal for phase should be steadily illuminated. This is accomplished through the control of Gate 101a on Triac 103. Gate 101a receives steady AC power over line $k_1$ from bus 26. When either WALK step 84 or Pedestrian Clearance step 92 is operated, an inhibit input is applied to Gate 101a from OR gate 101b. This inhibit input prevents the steady AC power applied to Gate 101a from line $k_1$ from being applied to Triac 103, thereby ensuring that the DONT WALK signal is not energized. On any other step, such an inhibit input is not received by Gate 101b so that Triac 103 receives steady AC energy to energize the DONT WALK signal.

A second output from phase 1 Pedestrian Clearance stage 92 is supplied to OR gate 87, for purposes which will be described later. Moreover, a third gating output from Pedestrian Clearance stage 92 is coupled via line $c_1$ to the phase 1 Pedestrian Clearance Adjustment Potentiometer 104 (FIG. 3C) whence it is coupled, in a fashion similar to that previously described, via timing bus 7 to the timer 48 in module 222, thereby to produce a stepping pulse on bus 8. This stepping pulse, appearing on line $g$, cooperates with the gating signal output appearing on line 100, mentioned previously, to initiate operation of the Initial Green step 99 in phase 1. The presence of a pedestrian call in memory 33, therefore, causes a normal timed operation to occur for Pedestrian Clearance step 92, followed by operation of Initial Green step 99 in phase 1.

One output from Initial Green step 99 is coupled via line 105 to triac 106; and said triac 106 further receives AC energization from bus $b$, whereby the green signal of phase 1 is energized. A second output 107 is coupled via OR gate 108 to inverter 109, running the Triac enabling input which is normally applied to Triac 10 by Inverter 109 and thus deenergizing the red signal lamp. It should be noted, however, that this is the only phase in which such inhibition is now occurring, and therefore the All Red Triac in phases 2 and 3 will, at this time, still be receiving enabling gates from their respective inverters to produce red signals on phases 2 and 3, while the green signal is energized on phase 1.

Initial Green step 99 further produces a gating signal on line $q$ which is coupled to bus 15 on the mother board (FIG. 3C); and if we assume that the signal control module shown in FIG. 3 is topped by a jumper plug, this gating signal is then coupled via jumper 62 to bus 13, whence it is further coupled via line $o$ to the gating input of the phase 1 Vehicle Clearance step 111.

A still further output appears on line 112 from Initial Green step 99; and this further output is coupled via a phase 1 Initial Green Adjust potentiometer 113 to the timing bus 7, thereby eventually causing production of a stepping pulse on bus 8 which steps on the controller into phase 1 Vehicle Clearance by initiating operation of step 111.

Operation of stage 111 supplies another input to OR gate 108 which, through Inverter 109, Keeps Triac 110 from receiving a gating input so that the red signal lamp remains deenergized. A second output from stage 111 appears on line 114, as a gating input to phase 1 All red step 115. A third output from step 111 is supplied to OR gate 116, the output of which is coupled via line $c$ to bus 18 on the mother board, for purposes to be described. A still further output from stage 111 appears on line 117; and this output operates in the manner described previously for other stages, to produce a signal on the timing bus 7, which results in initiation of a pulse on the stepping bus 8, causing phase 1 All Red step 115 to be energized after an appropriate timed delay.

When stage 115 is energized, OR gate 108 no longer receives an input; thus, Inverter 109 now supplies an enabling gate to triac 110, permitting the red signal lamp for phase 2 to be energized. A gating signal also passes via line 1 to the input of the phase 2 WALK step 117. Further outputs control the energization of triac 110, and produce a stepping pulse after an appropriate time period, all in the manner described previously, whereby the controller will step into phase 2 WALK after an appropriate delay.

The detailed operation of the overall controller, from this point is entirely similar to the operations which have already been described in reference to phase 1. More particularly, the outputs from phase 2 WALK step 117 will, after an appropriate time period, initiate operation of phase 2 Pedestrian Clearance step 118, which will in turn be followed by initiation of phase 2 Initial Green step 119 after an appropriate further time period. This stepping operation is governed by the status of signals in Pedestrian Memory 37, under the control of a pedestrian call button 119, to determine whether the controller normally times through stages 117 and 118, or fast steps from the output of phase 1 All Red step 115 to the input of phase Initial Green step 119. Once phase 2 Initial Green step 119 is operated, the controller continues its normal cycle of operation, stepping after appropriate time delays to phase 2 Vehicle Clearance step 120, then to phase 2 All Red step 121, then to phase 3 WALK step 122, phase 3 Pedestrian Clearance 123, and then to phase 3 Initial Green step 124. The signal paths affording these stepping operations have already been described in reference to the other phases, and will accordingly not be repeated in detail here.

The gating output from phase 3 Initial Green step 124 appears on line $s$, where it is coupled via bus 10 of the mother board through jumper 60, to bus 9 and thence via line 4 to the input of phase 3 Vehicle Clearance step 65. Due to the grounded connection 67 already described with reference to stage 65, the gating input on line $r$ will not initiate operation of phase 3 Vehicle Clearance step 65 until a next subsequent starting pulse appears on bus 9a.

The timer 48 and starter 51 are so arranged that a starting pulse will be produced at output 52 of starter 51 only when all of the bistable stages in the modular controller are in a cleared condition. A timer and starter circuit operating in this manner is described in the co-pending U.S. application of N. A. Bolton, Serial No. 319,761, filed October 29, 1963. Described briefly, this starter circuit operates by responding to the level of current in the timer 48 upon the occurrence of a stepping pulse. More specifically, a stepping pulse comprises a brief, negative-going voltage variation which removes energy momentarily from each interval register step, thereby extinguishing any step that was then in operative condition. At the termination of the stepping pulse, energy is re-applied and, under ordinary circumstances, the stage imemdiately following the one which was previously in the operative condition will then be the one out of the entire series of steps that is then operated. Under the present cricumstances, this re-application of energy occurring with respect to the Vehicle Clearance step 65 of phase 3 is ineffective to operate that step because its input is effectively grounded, as already described. This condition is detected in the timing circuit, however, by reason of a substantially zero current flow over bus 21, thereby producing a greater than normal voltage drop across a resistor in the timer 48. A circuit in the starter 51 responds to the voltage across such resistor and produces a pulse on the starter bus 9a whenever such lesser than normal voltage level is produced across said resistor. This starter pulse, being applied only to the vehicle clearance step 65 will now operate only that particular stage of all the stages employed in the signal control module.

This circuit arrangement is advantageous because it prevents the situation where two or more steps are operated concurrently. Also, it is of advantage in that it provides a way of placing the interval register in operating condition when power is first applied.

TWO-PHASE OPERATION

While the circuit and operation thus far described have contemplated that the controller will have three phases of operation, it should be noted that said circuit is also adapted, by simple modification, to act as a two-phase modular controller. More particularly, a jumper may be placed in the circuit between the output of phase 1 All-Red step 115 (line 1) and the gating input to phase 3 WALK step 122. All of the circuit boards for the phase 2 portion of the signal control module can then be pulled out of the circuit. A gating output from phase 1 All-Red stage 115, will by this arrangement, initiate operation of phase 3 WALK stage 122, without any intervening control functions; and the other control sequences will then occur nomally. The only two operative phases in the controller will then be those phases which have been shown in FIG. 3 as phase 1 and as phase 3; and these two phases will operate in the manner described thereby to provide a two-phase signal controller. FIG. 3 should therefore be recognized as illustrating not only a three-phase module, but as also illustrating a two-phase module.

SIX-PHASE OPERATION

The operating description already given has shown how the controller of FIG. 3 can be caused to provide either three-phase operation, or two-phase operation. A larger number of phases of operation can be controlled by stacking modules of the type shown in FIG. 3 upon one another. That is, a signal timer and power supply, associated with two three-phase signal control modules, and with a jumper plug at the very top of the stack, will provide six phases of operation. A stack of the type described, which includes a three-phase signal control module and a two-phase module, will provide five phases of control operation. A stack of the type described, which includes two two-phase signal control modules interconnected to one another, and to a timer and power supply module, as well as to a top jumper plug, will provide four phases of control operation. This possible expansion in the number of phases of operation which can be controlled, will readily be appreciated from the circuit already described in reference to FIGS. 3A, 3B, and 3C.

By way of example, let us assume that a three-phase modular controller of the type already described is in operation, and that it is desired to expand the operation to provide six control phases. This can be readily effected by stacking two three-phase modules of the types already described, one upon the other. The operation of the resulting array can readily be seen from consideration of FIGS. 3A, 3B, and 3C. If we momentarily assume, for example, that the circuit of FIGS. 3A–3C corresponds to the bottom three-phase module, it will be seen that when the said bottom module is in its phase 3 All-Red condition (i.e. stage 70 is operated), a gating output appears on line $n$. This gating output is coupled to bus 17 of the mother board on the bottom module. In the description given previously, it was assumed that the signal control was immediately topped by a jumper plug which provided jumper 63, to pass this gating signal from bus 17 to bus 19 of the mother board. If the module shown in FIG. 3B is, however, topped by an entirely similar three-phase module, the jumper 63 will not be present at this portion of the circuit, but will be located at the top of the upper module. Under these circumstances, the gating output from All-Red step 70, appearing on line $n$ and passing to bus 17 of the lower three-phase module will now pass to bus 17 of the upper module.

If we now look at the circuit of FIG. 3 as representative of the upper three-phase module, it will be seen that the gating signal appearing at its bus 17 will now pass upwardly to line $p$ and will, in the manner previously described, accordingly act as a gating input to the phase 1 WALK step 84 of the upper module. The upper module has the various vertical buses already described, including a timing bus such as 7, a stepping bus such as 8, etc.; and all of these vertical buses in the upper module are coupled to one another by means of the connector between the upper and lower modules. Accordingly, the signal timer and power supply module 222, associated with the stacked array of two three-phase modules, will supply all of the signals and signal paths needed to appropriately control operation of the upper three-phase module. The operation of the phase 1 WALK stage (corresponding to 84) in the upper module will accordingly be followed after appropriate time delay by actuation of the phase 1 Pedestrian Clearance step (corresponding to 92) in the upper module.

The upper three-phase module now continues the sequence of operation already described, going completely through phase 1 operation in the upper module controller, followed by phase 2 operation in the upper module, followed by phase 3 operation in the upper module. When the phase 3 All-Red step (corresponding to 70) in the upper module is operative, the gating signal will again appear on line $n$ in the upper module. This gating signal will, once more, be coupled to bus 17 on the mother board of the upper module. Since the upper module is topped by a jumper plug, a jumper such as 63 will be present, and the gating signal at bus 17 of the upper module will accordingly be coupled to bus 19 of the upper module. When the signal reaches the lower end of bus 19 of the upper module, it will not find a jumper such as 54 (see FIG. 3C) since this jumper is present internally in the timer and power supply module 222, which, for the circumstances described, is now located below the lower three-phase module. Accordingly, the signal which passes down bus 19 in the upper three-phase modular controller will now be coupled from upper modular controller to bus 19 of the lower modular controller and thence through jumper 54 in the timer and power supply module 44, and re-enter the lower module at its bus 17. The gating signal now passes upward to line $p$ in the lower signal control module acting as a gating input to the phase 1 WALK stage 84 of said lower signal control module. The lower signal control module will thereafter step in its normal sequence until it reaches the phase 3 All-Red step 70, at which time the same operation described previously will be repeated i.e. the gating signal will pass back to the upper signal control module.

By the sequence described, therefore, it will be seen that once operation is initiated in the lower signal control module, e.g. by applying a starting signal to the Vehicle Clearance step of said lower module, the composite signal controller will describe six phases of operation, with the three phases of operation in the module being followed by three phases of operation in the lower module, etc. In this respect, it should moreover be noted that the ground connection afforded by jumper 55 in the timer and power supply module 222, is applied only to the Vehicle Clearance step of the lower signal control module.

The upper signal control module also has a connection corresponding to $m$ which connects down to a bus 21 in the upper signal control module, and which in turn is connected to an upper terminal 21 in the lower module. However, as will be seen from FIG. 3C, the upper terminal 21 is an open terminal in each of the signal controllers, and therefore the line $m$ can be returned to ground by means of the jumper 55 in timer and power supply module only in that particular signal control module which is directly above module 222. For this reason, the inhibition which is applied to the phase 3 Vehicle Clearance step (such as 65) is applied only in that step for the signal control module directly above the timer and power supply module 222. If two three-phase modules are stacked one upon the other, the upper of said signal controllers will not pass its phase 3 Vehicle Clearance step to ground; instead the gating signal output from the phase 3 Initial Green step will operate in the normal manner to initiate operation of the phase 3 Vehicle Clearance step during the overall cycle of operation. A complete six-phase cycle of operation will accordingly occur starting and terminating at the phase 3 Vehicle Clearance step of the lower signal control module.

By an analysis of the type given above, it will, moreover, be seen that if a three-phase signal controller is combined with a two-phase signal controller in a stacked array, the overall controller will cycle through five phases of operation, and this operation will be independent of whether the three-phase controller is superposed by a two-phase controller, or vice versa. Moreover, by a similar analysis, it will be seen that if a two-phase controller is superposed by another two-phase controller, the overall resultant signal controller will cycle through four operating phases.

It will, moreover, be seen that various different arrangements could be effected by the circuit thus described to expand the phases of operation to whatever extent might be desired. Thus, if three two-phase signal control modules are stacked one upon the other, the composite signal controller will exhibit six phases of operation. The stacking of three three-phase signal modules upon one another will produce a controller which will give nine phases of operation. Two three-phase signal modules combined with a two-phase signal control module will give eight phases of operation, etc. The actual number of phases of operation is dictated solely by the desire of the user, and any desired number of phases can be controlled by stacking appropriate units one upon the other. In any such stacked array, the connections already shown and described result in an appropriate routing of gating signals from one to another module at appropriate times in the overall operating cycle. This is accomplished in every case by having the gating line so arranged that, at an appropriate part in any particular cycle, the signal control module then in operation will effectively "look" to see whether or not another signal control module is disposed above the signal control module then in operation (e.g. as in the case of the gating line $n$ coupled to bus 17). Moreover, the gating line arrangement is such that at some other appropriate time in the normal operation of the composite array of signal control modules, the signal control module then in operation will effectively "look" to see whether there is some other signal control module below it (e.g. in the case of gating line $q$ associated with bottom terminal 17 of the signal control module shown in FIG. 3). The particular disposition of gating lines thus utilized in plural signal control modules, cooperating with a single timer and power supply module, and with a single jumper plug at the uppermost end of the array, causes gating signals to be automatically routed up and down the stack of signal control modules so as to bring all phases of those signal control modules into proper operation, in proper sequence.

VEHICLE-ACTUATED COMPUTER MODULE

If it is desired that a pre-timed controller be converted to operate as a vehicle-actuated controller, it is only necessary that a computer module be included in the stack of modules. For example, referring to FIG. 1 which illustrates a stacking of a timer and power supply module, three-phase signal control module, and jumper plug module, the three-phase, pre-timed controller thus formed may readily be converted to operate as a three-phase, vehicle-actuated controller by the mere interposition of a computer module between the jumper plug module 212 and the signal control module 221. More specifically, it will be considered herein that it is desired to have the controller operate as a three-phase, fully-actuated computer and to accomplish this a suitable module providing for full actuation, i.e. vehicle actuation on each phase, is inserted between the signal control module and jumper plug module.

With reference to the drawings, and particularly with reference to FIGS. 3A–3C, the three-phase, pre-timed controller illustrated thereby may be considered as being modified for fully-actuated operation by placing FIGS. 4A, 4B and 4C above, respectively, FIGS. 3A, 3B, and 3C, thereby simulating the placement of a computer module, represented by FIGS. 4A–4C, directly above the signal control module illustrated in FIGS. 3A–3C. In effecting this stacking of modules, it must of course be kept in mind that the jumper connections provided by the jumper plug module are not in effect with respect to the vertical bus terminations at the top of the signal control module of FIG. 3C and represented there by dotted line connections between selected mother board buses. Instead, the vertical buses of FIG. 4C are to be considered as being plug coupled directly to the vertical buses of FIG. 3C with connections being effected by plug coupling means from any one numbered bus of FIG. 3C to the correspondingly numbered bus of FIG. 4C.

Before proceeding with a detailed description of the vehicle-actuated controller combination, reference is made to FIGS. 5A and 5B. FIG. 5A represents, by a polar diagram, the sequence of signal operations which are assumed to take place in a three-phase, pre-timed controller. The sequence is thus in accordance with the mode of operation already described in connection with FIGS. 3A–3C.

When the controller is operating in a vehicle-actuated mode, either semi-actuated or fully-actuated, provision must be made for the controller to dwell in one or more phases. Thus, when operating in the fully-actuated mode, the controller must be capable of dwelling in any phase pending a vehicle or pedestrian call on some other phase. Similarly, when operating in the semi-actuated mode, the controller must be capable of dwelling on the non-actuated phase, with provision for operating out of the phase wherein it dwells in response to a vehicle or pedestrian call on either of the actuated phases. Thus, there is a requirement that a dwell step be provided in the interval register in which no interval timing takes place corresponding to that which takes place, for example, on each step of the interval register when operating in the pre-timed mode. It is also generally provided that there shall be an additional step of the interval register which is operated immediately subsequent to the dwell step and on which timing takes place which is dependent upon traffic congestion conditions on the then-actuated phase. After this timing is completed, the interval register operates to the vehicle clearance step, and from there on operation is similar to that already described for the pre-timed mode of operation.

This altered mode of operation is illustrated graphically in FIG. 5B which shows the successive intervals of one typical phase. The duration of the dwell step is, of course, indeterminated since it is only terminated by the occurrence of a call or some other phase. However, if such call is present at the turn that the dwell step is first operated, this step will terminate almost instantly. On the time extension step, the duration will be a function of the amount of traffic detected.

From the description that has already been given with respect to FIGS. 3A–3C, it will be recalled that the interval register disclosed therein comprised five discrete steps for each phase, and the complete interval register for the three phases was designed to operate through all its steps for all the phases in sequence, in a repetitive, cyclical fashion. It is now evident, however, from what has just been said, that when the pre-timed controller is to be converted to operate in the fully-actuated mode by the addition of the module of FIGS. 4A–4C, it is necessary, in effect, to insert additional steps in the interval register for each phase, namely, a Dwell Step and a Time Extension step. This is accomplished by providing suitable connections from appropriate interval register steps of the signal control module of FIGS. 3A–3C to the intermodule bus unit or mother board so that connections can then be made to the corresponding bus unit in the computer module of FIGS. 4A–4C, and thence to the appropriate interval register steps of the computer module.

Assuming that the computer module of FIGS. 4A–4C is plug coupled to the signal control module of FIGS. 3A–3C, and assuming that the controller has now operated to the condition wherein the Initial Green step 99 of phase 1 (FIG. 3A) is operated, it will be understood from what has just been stated that the interval register must now not operate directly to the Vehicle Clearance step 11 as it ordinarily does, but must now instead operate the Dwell step 310 for phase 1 included in the computer module (see FIG. 4A); thus, when the Initial Green step is operated, a gating output is provided on output lead $q$ to bus 15 and then through the plug coupler connecting this module with the computer module of FIG. 4C so that gating energy appears on bus 15 as well as in FIG. 4C. On FIGS. 4A–4C, the lead $q$ is shown as connecting to the gating input of Dwell step 310. Being thus conditioned by a gating input, it is only required that a stepping pulse appear on lead $g$ in order that the Dwell stage 310 will be operated. From the description previously given, it will be recognized that such a stepping pulse will indeed appear on lead $g$ since this lead in FIGS. 4A–4C is shown as being connected to bus 8, and this bus receives an output from timer 48 in the timer and power supply module 222 of FIG. 3C, with the time of occurrence of such stepping pulse being dependent upon the interval timed in timer 48 during the time that the Initial Green step 99 of phase 1 is operated. Thus, it will be seen that the normal mode of operation is now quite different from what was described when the computer module of FIGS. 4A–4C was not present in that the interval register does now not operate directly from the Initial Green step 99 to the Vehicle Clearance step 111, but instead operates the Dwell step 310 in the computer module 311.

The Dwell step 310 does not provide an output to the timer 48 in the timer and power supply module 222 as do, for example, the several stages of the interval register in the signal control module of FIGS. 3A–3C. Thus, no timing operation takes place in the Dwell step, and accordingly the interval register will remain indefinitely on the Dwell step of phase 1, pending the receipt of a vehicle or pedestrian call on one of the other phases. As will later be described, while on the Dwell step, an output signal is provided which provides for a green signal on phase 1 the same as if the interval register were then operating on the Initial Green step. The difference now is that the green signal indication on phase 1 is not subject to any timing action, but instead the controller will remain indefinitely in this condition, providing a green signal indication continually for phase 1, until a vehicle or pedestrian actuation on any other phase has been received.

The Dwell stage 310 does nevertheless provide a gating input to the Timer Extension step 312 over lead 313, thereby conditioning step 312 so that only the receipt of a stepping pulse on lead $g$ need occur in order for the Dwell step 310 to be restored to its normal condition and the Time Extension step 312 instead to become operative. As indicated already, only the occurrence of a vehicle or pedestrian call on some other phase will effect operation to the Time Extension step 312, and the manner in which this is effected will now be described. Thus, it will be noted that there is associated with each phase in the computer module of FIGS. 4A–4C a Storage Unit such as the phase 1 Storage Unit 314 of FIG. 4A. Each Storage Unit comprises a flip-flop or other suitable memory device which is in a normal condition whenever there is no vehicle or pedestrian call on phase 1, but operates to an opposite condition whenever there is such a vehicle or pedestrian call. More particularly, it will be noted that three vehicle detector relays VR1, VR2, and VR3 are illustrated in FIG. 4A. Each relay is associated with a corresponding vehicle detector on the associated first, second and third phases, and each normally picked up relay drops away momentarily when a vehicle is detected on either of the approaches to the intersection associated with that phase. Thus, assuming that a vehicle approaches the intersection with phase 1, i.e. the approach which will receive a proceed indication on phase 1, relay VR1 will be momentarily released and close its back contact 315 to apply energy over lead 316 to the flip-flop 317, thereby operating the flip-flop from its normal condition. The flip-flop can also be operated from its normal condition in response to a pedestrian call signal on phase 1. Thus, assuming that the phase 1 pedestrian pushbutton 95 of FIG. 3A has been actuated, thereby operating the Pedestrian Memory 33 from its normal condition, an output will then be supplied over lead $q_1$ to bus 23 of FIG. 3C and thence upward over bus 23 of FIG. 4C to lead $q_2$ which extends across FIGS. 4A–4C to an input terminal of the flip-flop 317.

In a similar manner, each phase has associated therewith a storage unit as exemplified by the phase 2 storage unit 318 and phase 3 storage unit 319, both illustrated in FIG. 4B. Each includes a flip-flop 320 and 321, respectively, which flip-flop is operated from its normal condition in response to either a vehicle or pedestrian call on that phase.

Assuming that the fully-actuated controller now being described is in the condition wherein the Dwell step 310 of phase 1 is in its operated condition and that a call has been received on phase 3, but not on phase 1, the flip-flop 321 of the phase 3 storage unit 319 is operated, but neither the flip-flop 317 of phase 1 nor flip-flop 320 of phase 2 is then operated. It will be noted that the phase 1 Storage Unit 314 includes an OR gate 322 which receives one gating input over lead $a_2$ from flip-flop 320 of the phase 2 Storage Unit 318 and receives a second input over lead $b_2$ from flip-flop 321 of the phase 3 Storage Unit 319. Under the presently described circumstances, an input will be applied to the OR gate 322 from flip-flop 321 so that an output will be provided by this OR gate 322 to AND gate 323 in the phase 1 Green Signal Control Unit 324.

Since Dwell step 310 is now operated, a second input is applied to this AND gate 323 over lead 325, thereby fulfilling both inputs to AND gate 323 so that an output signal is now applied to lead $c_2$ which extends to bus 24 on FIG. 4C. This is the fast step bus which, as previously described, supplies an input on bus 24 of FIG. 3C to timer 48 which responds to such input by immediately applying a pulse to bus 8. Such a pulse on bus 8 produces a stepping pulse on lead $g$ which extends to both the Dwell and Time Extension steps for each phase illustrated in FIGS. 4A and 4B, and since it is only the Time Extension step 312 of phase 1 which is now receiving a gating input, it is this step which is now operated concurrently with the restoration of Dwell step 310 to its normal condition.

When the time extension step 312 is operated, it supplies a gating output over lead $d_2$ to bus 13 of FIGS. 4C and 3C. In FIG. 3C, lead $o$ connects to bus 13 so that a gating signal is applied directly to the gating input of the Vehicle Clearance step 111 in FIG. 3A. At the conclusion of the Time Extension step 312, an output signal is applied to fast step bus 24 to produce a stepping pulse on bus 8 which transfers operation from Time Extension step 312 to Vehicle Clearance step 111. This is a pre-timed step as already described, so that, at the end of a pre-determined interval, a further stepping pulse appears on bus 8 thereby restoring the Vehicle Clearance step 111 and operating the All-Red step 115.

From the description given thus far, it can be seen that the insertion of the computer module 311 between the signal control module of FIGS. 3A–3C and the jumper plug module has the effect of inserting two additional steps into the successive steps which are ordinarily provided for each cycle, the additional steps being the Dwell step and Time Extension steps provided for each phase in the computer module of FIGS. 4A–4C.

The circuits of FIGS. 3A–3C and 4A–4C provide, in a similar manner, that additional Dwell and Time Extension steps shall be automatically inserted in the chain of steps provided for each phase in the signal control module with the Dwell step of each phase being operated after the Initial Green step of that phase, with the Time Extension step being operated directly after the Dwell step, and with operation being restored to the signal control module by operation of the Vehicle Clearance step directly after the Time Extension step.

In the description, given thus far, it was pointed out how operation occurred from the Dwell step to the Time Extension step of phase 1 in response to a vehicle or pedestrian call on phase 3. It will be apparent that a similar arrangement is provided to operate out of the Dwell step of either of the other phases in response to a vehicle or pedestrian call on any other phase. More particularly, with respect to operating out of the Dwell step on phase 1, it was seen that this was accomplished in response to a vehicle or pedestrian call on either phase 2 or phase 3 since the flip-flops 320 and 321 of those other phases were each capable of providing an input to OR gate 322 which would initiate operation of the Dwell step of phase 1. In an analogous manner, operation out of the Dwell step 327 of phase 2 would readily occur upon the presence of a vehicle or pedestrian call in either phase 1 or 3 as represented by the operation of either flip-flop 317 or 321 of those two phases, respectively, from their normal condition. Also, operation out of the Dwell step of phase 3 would readily occur upon the operation of either flip-flop 317 or 320 of phases 1 and 2, respectively at any time when the Dwell step 328 of phase 3 was operated.

Assuming now that the controller has moved out of the phase 1 Dwell step 310 to the Time Extension step 312, timing of the time extension step must now take place dependent upon traffic conditions. It is, of course, possible that the controller has been in this Dwell step 310 for a considerable length of time and that no traffic is now approaching the intersection on the corresponding phase 1 approaches to the intersection. Nevertheless, it is necessary to provide for traffic-responsive timing before going on to the next step because, for one thing, it is possible that the controller has been in the Dwell step 310 for only a very brief interval, thereby allowing thus far only a very brief phase 1 green signal and because it is also possible that one or more vehicles have just passed the detector locations for phase 1, and sufficient time must be given to permit such vehicles to pass through the intersection.

The traffic-responsive timing in the time extension step takes place in the phase 1 Timer Unit 329 which includes an interval timer 330 and a maximum timer 331 as well as a gate 332. The gate 332 receives an enabling input over lead 333 from the output of the time extension step 312, and an input is also applied to maxium timer 331 over this same lead 333. Interval timer 330 receives an input from lead 316 upon each actuation of the phase 1 vehicle detector relay VR1.

Interval timer 330 measures a vehicle extension interval in response to each vehicle detected. Thus, each momentary closure of back contact 315 of relay VR1 resets interval timer 330 so that, when successive vehicles pass a detector with only short intervals therebetween, timer 330 has no opportunity to time out. If, however, a gap occurs in the traffic so that there is no actuation of relay VR1 for a time in excess of the interval timed by timer 330, then this timer will time out and supply an input to gate 332. Assuming that the timer extension step 312 is then concurrently in the operative condition so that a gating input is also present on input lead 333, the gate 332 will have both of its inputs fulfilled and will supply an output on lead e2 to fast step bus 24 thereby resulting, in the manner previously described, in a stepping pulse on bus 8 which will now advance the interval register from the now-operated Timer Extension step 312 to the Vehicle Clearance step 111 of FIG. 3A according to the routing of the gating inputs previously described.

If vehicles appear in rapid succession and for a relatively long time on the phase 1 approaches to the intersection so that the timer 330 does not have an opportunity to time out, it is nevertheless necessary to terminate phase 1 and go on to the next phase which is then storing a vehicle or pedestrian call. This is accomplished by timing a maximum duration for the interval that the time extension step will be maintained in its operative condition.

Thus, upon the initial operation of the Time Extension step 312, an input is supplied over lead 333 as already described, to an input of maximum timer 331. This input sets the timer 331 into operation, timing a maximum time interval for the time extension step, at the end of which a pulse appears on lead e2 which extends to the fast step bus 24, thereby again resulting in the application of a stepping pulse on stepper bus 8 so that operation of the interval register is advanced from Time Extension step 312 to Vehicle Clearance step 111 of FIG. 3A.

When operating as a traffic-actuated controller, it is necessary that the green signal for each phase be displayed not only during the Initial Green interval but also during the Dwell and Time Extension steps. Referring to FIG. 4A, it will be seen that both the Dwell step 310 and Time Extension step 312 supply an output to OR gate 334 so that an output signal appears on lead f2 whenever either of the Dwell or Time Extension step 310 or 312 is operated. This signal appears on bus 6 in FIGS. 4C and 3C and is applied over lead f in FIGS. 3A–3C to one input of OR gate 108 included in the phase 1 Vehicle Interval Unit of FIG. 3A. The signal is also applied as input to OR gate 335 in the same vehicle interval unit, which OR gate also receives an input from Initial Green step 335. The output of OR gate 335 connects to Triac 106; thus, when either of the Initial Green Dwell, or Time Extension steps of this phase is operated, one or the other of the input leads to OR gate 335 is energized so that output energy is applied to Triac 106 and the green signal lamp of phase 1 is illuminated.

As previously described, Triac unit 110 controls the illumination of the phase 1 red signal, and this Triac unit is controlled by Inverter 109 which in the absence of any input to OR gate 108, receives no input from that gate and thus does supply an output signal to Triac 110, gating that Triac to energize the phase 1 red signal lamp. However, when either the Initial Green 99, Dwell 310, Time Extension 312, or Vehicle Clearance 111 steps is operated, an input is supplied to OR gate 109 so that Inverter 109 receives an input signal. In response thereto, Inverter does not supply an output signal to Triac 110 with the result that the red signal lamp is not illuminated.

Similar gate and inverter circuits are associated with the phase 2 and phase 3 Vehicle Interval Units of FIG. 3B and with the phase 2 and phase 3 Green Signal Control Units of FIG. 4B to control the illumination of the green and red signal lamps of both phases 2 and 3.

From the description previously given, it will be apparent that after the Dwell and Time Extension steps of phase 1 have, in turn, been operated, and thereafter the Vehicle Clearance and All-Red steps 111 and 115 of phase 1 in the signal control module of FIG. 3A, that thereafter the WALK step 117 of phase 2 will next be operated since it is this step which receives a gating input over lead e from the All-Red step 115 of phase 1. Under the assumed conditions of operation, however, it has been considered that operation out of the Dwell step 310 of phase 1 occurred in response to a vehicle or pedestrian call on phase 3 but that no vehicle or pedestrian call existed on phase 2. It is therefore necessary to skip phase 2 entirely and operate directly to phase 3. This is accomplished, as will presently be described, by fast stepping through all of the steps of phase 2 including the Initial Green step 119, Vehicle Clearance step 120, All-Red 121, WALK step 117, Pedestrian Clearance step 118, as well as Dwell step 327 and Time Extension step 336.

Described generally, this is accomplished by taking an output from each of these steps through an OR gate to the storage unit of the corresponding phase in the computer module of FIGS. 4A–4C to determine there whether or not a pedestrian or vehicle call is being stored. If no pedestrian or vehicle call is stored therein, an output signal is applied directly to the fast step bus 24 so that immediate operation to the next step will occur. It is only in the event that the vehicle or pedestrian call has operated the flip-flop of the storage unit from its normal condition that the appearance of a pulse on the fast step bus is prevented.

More specifically, when the WALK step 117 of phase 2 is operated, an output signal is applied from the WALK step over wire 337 to one input of OR gate 338. When the Pedestrian Clearance step 118 is operated subsequently, a similar output is obtained therefrom and applied over lead 339 to the same OR gate 338. The output of gate 338 is applied as one input to OR gate 340 which also receives an input from the Initial Green step 119. Thus, whenever either of these steps, i.e. WALK step 117, Pedestrian Clearance step 118, or Initial Green step 119 is operated, an output signal is obtained from OR gate 340 which is applied over lead e to bus 2 on FIGS. 3C and 4C. The signal is applied over lead g2 in FIGS. 4B and 4C to one input of gate 341 in the phase 2 Storage Unit 318. This gate 341 operates by normally supplying an output on lead 342 to lead c2 in the absence of an inhibit input received from flip-flop 320. Thus, in the normal condition of flip-flop 320, indicative of the absence of a vehicle or pedestrian call on phase 2, an input to the gate 341 will result in the immediate appearance of an output pulse on lead 342; however, if the inhibit input from flip-flop 320 is present on gate 341, an input signal such as that obtained from lead g2 and applied to gate 341 will not produce an output on lead 342 extending to lead c2.

When an output is applied to lead c2 from gate 341, a stepping pulse is immediately produced because lead c2 connects, as previously described, directly to fast step bus 24, thereby resulting in the appearance of a stepping pulse on bus 8. In other words, if either the WALK step 122, Pedestrian Clearance step 123, or Initial Green step 124 phase 2 is operated, and there is at the same time no vehicle or pedestrian call in flip-flop 320, then there will be the immediate occurrence of a stepping pulse on bus 8 to advance the operation of the interval register from, successively, the WALK step, to the Pedestrian Clearance step, and thence to the Initial Green step, eventually transferring from the Initial Green step to Dwell step 327 in FIG. 4B.

Under the assumed conditions, there will also be an immediate transfer of operation of the interval register out of the Dwell step 327 to the Time Extension step 336 because it is assumed that there is a storage in flip-flop 321 which means, according to the previous described, that OR gate 343 is receiving an input from flip-flop 321 so that AND gate 344 has one of its two inputs fulfilled. The operation of Dwell step 327 supplies the other input to AND gate 344 so that a pulse will immediately appear on lead c2 and thus produce the immediate appearance of a stepping pulse on bus 8 so as to transfer operation from Dwell step 327 to Time Extension step 336.

In time extension step 336, an output is supplied over lead 345 to the input of gate 341, thereby producing an immediate output pulse on lead 342 in view of the assumed absence of an inhibit input to gate 341 from flip-flop 320. Therefore, there is immediate operation from Time Extension step 336 to Vehicle Clearance step 120 shown in FIG. 3B.

In both the Vehicle Clearance step and the All-Red step 121, there is immediate operation through both of these steps because, on each step, an input is supplied from the respective step to OR gate 346 which then produces an output signal on lead u, over bus 16 and lead h2 (FIGS. 4B, 4C) to the input of gate 341. Again assuming that there is no vehicle or pedestrian storage in flip-flop 320, there will be no inhibit input to gate 341 so that a signal will immediately be produced on lead c2 which extends to the fast step bus 24. As before, there will thus be an immediate operation from the Vehicle Clearance step 120 to All-Red step 121, and then to WALK step 122 of phase 3.

In phase 3, as contrasted with phase 2, there cannot be immediate operation from one step to the next, because, under the assumed conditions, there is no vehicle or pedestrian call stored in flip-flop 321. Accordingly, operation in phase 3 is similar to that previously described in connection with phase 1.

ALTERNATIVE COMBINATIONS OF MODULES—FIGS. 2A–2E

Figure 2A:
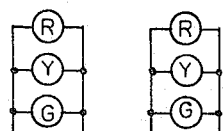
Figure 2A:
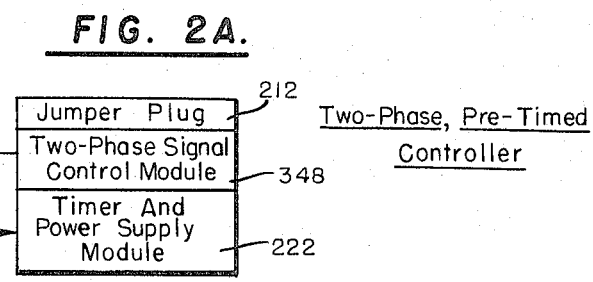

FIGS. 2A–2E illustrate various alternative combinations of modules to provide different types of signal controllers. FIG. 2A illustrates the combination of the timer and power supply module 222 and jumper plug 212, with a two-phase signal control module 348 interposed therebetween. This combination of modules provides, as indicated, a two-phase pre-timed controller.

Figure 2B:
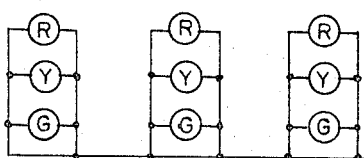
Figure 2B:
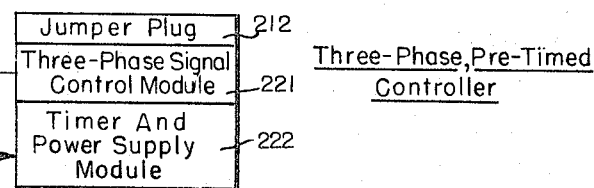

FIG. 2B illustrates the combination of modules which has been described in detail in connection with the combination of FIGS. 3A–3C, together with FIGS. 4A–4C, i.e. a three-phase, pre-timed controller. The combination again comprises a timer and power supply module 222, and jumper plug 212, with the three-phase signal control module 221 interposed between the two.

Figure 2C:
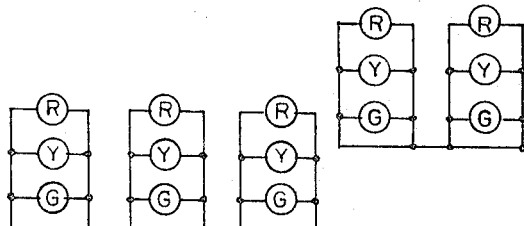
Figure 2C:
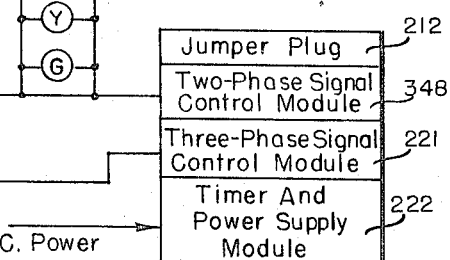

FIG. 2C illustrates a combination of modules which comprises, between the timer and power supply module 210 and jumper plug 212, a three-phase signal control module 311 and a two-phase signal control module 348, the combination together operating as a five-phase, pre-timed controller. It will be apparent from the description already given which has related to the mode of operation when two three-phase signal controllers are plug coupled together and which has further described how a three-phase controller may be readily modified by means of a jumper connection so as to operate in two-phase fashion, how the combination of FIG. 2C will readily operate as a five-phase controller, being pre-timed because of the absence of any computer module.

Figure 2D:
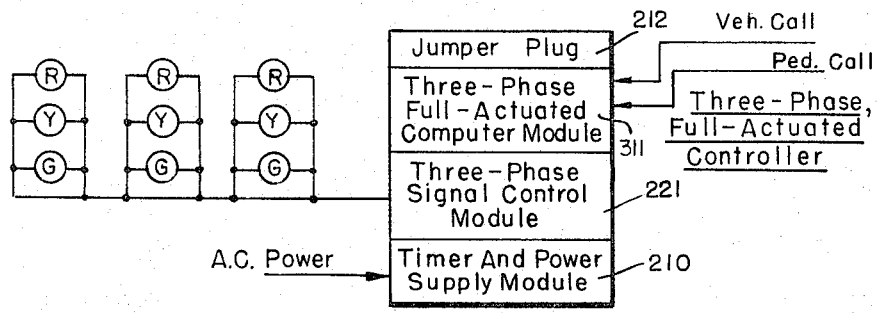

FIG. 2D illustrates the combination which has already been described, namely, the timer and power supply module 210 and jumper plug 212 with a three-phase signal control module 311 coupled directly to module 210 and with a three-phase, fully-actuated computer module coupled between module 311 and jumper plug 212. The combination illustrated then operates as a three-phase, fully-actuated controller as has just been described in detail.

Figure 2E:
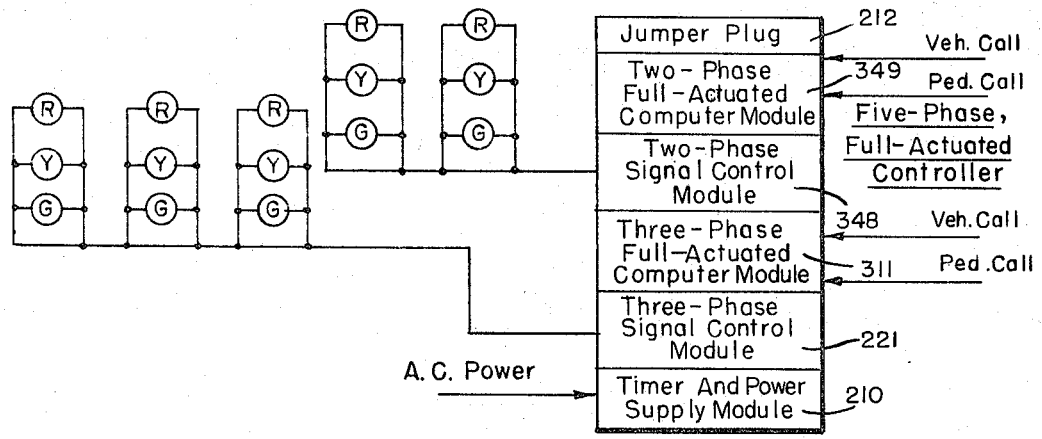

FIG. 2E illustrates a combination of modules which operates as a five-phase, fully-actuated controller. The combination comprises again, the timer and power supply module 222 and jumper plug 212. Between these two, there are interposed, in sequence, a three-phase signal control module 221, with a three-phase fully-actuated computer module 311 adjacent the three-phase signal control module. Above the computer module 311 is a two-phase signal control module 348, and coupled between this module and jumper plug 212 is a two-phase fully-actuated computer module 349. The computer module 311 converts the operation of the three-phase signal control module 221 to vehicle-actuated operation. From the description given thus far, it will be apparent how the coupling thereto of a two-phase signal control module 348 will provide two extra phases to make a five-phase controller. Moreover, the computer module 349 will cooperate with the control module 348 to cause the latter to operate in the vehicle actuated mode, thereby forming, in combination, a five-phase fully-actuated controller.

Having described several forms as one specific embodiment of the present invention, it is desired to be understood that this form is selected to facilitate in the disclosure of the invention rather than to limit the number of forms which it may assume; and, it is to be further understood that various modifications, adaptations and alterations may be applied to the specific form shown to meet the requirements of practice, without in any manner departing from the spirit or scope of the present invention.

What is claimed is:

1. A traffic signal controller comprising a first chassis having a plurality of first interval register steps mounted thereon, said first chassis having a plural terminal first electrical connector adjacent an exterior side of said first chassis, first gating input and output lines on said first chassis interconnecting the inputs and outputs of all but two of said plurality of first interval register steps, one of said two interval registers in said plurality of first register steps having a gating output line connected to a firts terminal of said first connector and the other of said two interval registers having a gating input line connected to a second different terminal of said first connector, an external connector adapted to separably mate with said first electrical connector to complete a circuit between said first and second terminals whereby said plurality of first interval register steps are interconnected in a first ring counter configuration adapted to control a first plurality of signal lights in a predetermined sequence, a second chassis having a plurality of second interval register steps thereon, said second chassis having a plural terminal second electrical connector adjacent an external side of said second chassis, second gating input and output lines on said second chassis interconnecting the inputs and outputs of all but two of said plurality of second interval register steps, one of said two interval registers in said plurality of second interval register steps having a gating input line connected to a first terminal of said second connector and the other of said two interval register steps having a gating output line connected to a second different terminal of said second connector, said second connector being constructed to mate with said first connector in place of said external connector to complete circuits between said first terminals and said second terminals of said first and second connectors respectively thereby to separably interconnect the inputs and outputs of all of said first and second interval registers in a second ring counter configuration having a number of stages greater than said first ring counter configuration, and adapted to control a second plurality of signal lights, greater in number than said first plurality of lights, in a predetermined sequence.

2. The controller of claim 1, including a first plurality of buses in said first chassis respectively connected to said first interval register steps and also connected respective certain terminals of said first electrical connector, a second plurality of corresponding buses in said second chassis respectively connected to said second interval registers and also connected to respective terminals of said second electrical connector which correspond to said certain terminals of said first electrical connector whereby said first and second pluralities of buses are respectively interconnected to one another when said first and second connectors are mated, and power and timer means connected to different buses of said first plurality of buses for energizing and timing said first ring counter, said same power and timer means being also counpled to said second buses when said first and second connectors are mated for energizing and timing said second ring counter.

3. The controller of claim 2 wherein said power and timer means comprise a third chassis, and a separable electrical connector between said first and second chassis for separably connecting said power and timer means to said first plurality of buses.

4. A a traffic signal controller comprising a first chassis having a plurality of interval register steps mounted thereon, said first chassis having first and second plural terminal electrical connectors spaced from one another on said first chassis, gating input and output lines on said first chassis interconnecting the inputs and outputs of all but two of said plurality of interval register steps, one of said two intervals register steps in said plurality of register steps having a gating output line connected to a first terminal of said first connector and the other of said two interval register steps having a gating input line connected to a second different terminal of said first connector, an external jumper plug adapted to separably mate with said first electrical connector to complete a circuit between said first and second terminals, whereby said plurality of interval register steps are interconnected as a ring counter adapted to control a plurality of signal lights in a predetermined sequence, a plurality of buses on said first chassis connected to said plurality of interval registers and also connected to the terminals of said second connector, and a second chassis having a time and power supply means therein connected to a third plural terminal connector on said second chassis constructed to separably mate with said second connector for transferring signals to and from said plurality of buses on said first chassis thereby to energize and control the operation of said ring counter.

5. A traffic signal controller comprising a plurality of first interval register steps, means interconnecting the inputs and outputs of said plurality of first register steps in a ring counter configuration, said interconnecting means including a first electrical connector for selectively making and breaking the interconnection between two of said first register steps, first control means for operating said first register steps in a predetermined sequence to produce a first plurality of output control signals from successive different ones of said first interval register steps to control a first plurality of traffic signal lights, a plurality of second interval register steps, means including a second electrical connector for connecting the inputs and outputs of said plurality of second interval register steps, said second electrical connector being constructed to mate with said first electrical connector to selectively insert said plurality of second interval register steps into said ring counter configuration at a location between said two register steps of said plurality of first registers thereby to form a composite ring counter having both said first and second register steps therein, and further control means cooperating with said first control means for operating the registers of said composite ring counter in a predetermined sequence to produce a second plurality of output control signals, larger in number than said first plurality of output control signals.

6. The controller of claim 5 wherein said first and second interval registers are respectively on first and second independent chassis, said first and second connectors being mounted on said first and second chassis respectively.

7. A traffic controller comprising chassis means having a plurality of interval register steps mounted thereon, each of said steps including a gating signal output line for providing an output gating signal in response to operation of said step, each of said steps further including a gating signal input line for selectively applying an input gating signal to said step for conditioning said stage for operation, means interconnecting the gating signal output line of each of said steps to the gating signal input line of a different one of said steps, stepping means for applying a stepping signal to all of said steps simultaneously, each of said steps including means responsive to joint application of a stepping signal and of an input gating signal thereto for rendering said step operative, whereby successive operation of said stepping means renders successive different ones of said steps operative in a sequence dependent upon the interconnections of said gating signal input and output lines, said chassis means including at least two units separably joined to one another by separable electrical connectors comprising a portion of said gating line interconnecting means, said separable connectors comprising a plurality of spaced electrical terminals on one of said units separably mating with a plurality of spaced electrical terminals on the other of said units, at least one of said gating signal output lines extending from the output of a first step in one of said units to a first electrical terminal in said one unit, at least one of said gating signal input lines extending from the input of a second step in said one unit to a second electrical terminal in said one unit, and electrical means in the other of said units connected between spaced terminals in said other unit mating with said first and second terminals in said one unit for transferring a gating signal from the output of said first step in said one unit to the input of said second step in said one unit via said electrical means in said other unit.

8. The controller of claim 7 wherein said electrical means comprises a continuous electrical connector in said other unit.

9. The controller of claim 7 wherein said electrical means comprises a plurality of interconnected interval register steps in said other unit.

10. The controller of claim 7 wherein said electrical means comprises at least one interval register step in said other unit, and vehicle responsive means for controlling the length of time that said one step remains in an operative condition, said one step controlling an associated traffic signal to display a particular signal indication throughout said length of time that said one step is in said operative condition.

11. A modular traffic signal controller comprising at least first, second and third units separably connected to one another by a first electrical connector between said first and second units and by a second electrical connector between said second and third units, said second unit including first and second groups of spaced terminals forming portions of said first and second electrical connectors respectively, a plurality of traffic interval control steps in said second unit, each of said control steps including means for producing a signal light control output in response to operation of said step, a plurality of control lines interconnecting the inputs and outputs of said control steps operative to route control signals from one to another of said stages thereby to render different ones of said stages operative in a desired control sequence, said control lines including first and second line portions connected to a first pair of spaced terminals in said first group of terminals, whereby control signals normally cannot pass from one to the other of said first and second line portions, said control lines also including third and fourth line portions connected to a second pair of spaced terminals in said second group of terminals whereby control signals normally cannot pass from one to the other of said third and fourth line portions, a third pair of terminals in said first unit forming a portion of said first electrical connector, signal transfer means in said first unit connected between said third pair of terminals for controlling the transfer of control signals between said first and second line portions of said second unit when said first and second units are connected to one another, a fourth pair of terminals in said third unit forming a portion of said second electrical connector, and further signal transfer means in said third unit connected between said fourth pair of terminals for controlling the transfer of control signals between said third and fourth line portions of said second unit when said second and third units are connected to one another.

12. A traffic signal light controller comprising a plurality of first interval registers, each of said registers including a plurality of interconnected stages, means interconnecting the inputs and outputs of said plurality of first registers in a ring counter configuration, said interconnecting means including first electrical connector means for selectively making and breaking the interconnection between two of said registers, said interconnecting means also including second electrical connector means for selectively making and breaking the interconnection between two of the stages of an individual register, timing means for operating said registers in a predetermined sequence to produce a plurality of output control signals from successive different ones of interval registers to control a plurality of traffic signal lights, a plurality of interconnected second interval registers, third connector means coupled to said second registers and adapted to cooperate with said first connector means to selectively insert said plurality of second interval registers into said ring counter configuration at a location between said two registers of said plurality of first registers thereby to form a composite ring counter having both said first and second pluralities of registers therein for increasing the number of traffic signal light output control signals, control means and fourth connector means connected to said control means and adapted to cooperate with said second connector means for controlling the transfer of signals between said two stages of said individual register.

13. The controller of claim 12 wherein said control means includes means for inhibiting the transfer of signals between said two stages of said individual register, and external switch means for selectively initiating said transfer of signals between said two stages.

14. A modular traffic signal controller comprising a plurality of separate chassis, each of said chassis including multiple terminal electrical connector means mating with complementary electrical connector means on another of said chassis for separably connecting said plurality of chassis in an aligned chassis array, a first one of said chassis comprising a timer and power supply operative to supply timing signals and power to the others of said chassis via buses in said other chassis connected to said timer and power supply through said electrical connector means, a second one of said chassis including a plurality of bistable stages having the inputs and outputs of all but two of said stages interconnected to one another, and a third one of said chassis including electrical means for interconnecting the input and output of said two stages through said electrical connector means to complete the stage interconnections on said second chassis to form a ring counter times and energized by the timer and power supply of said first chassis and operative to produce a sequence of output signal light control signals.

15. A traffic signal light controller comprising, a first module including counter means, timing means for operating said counter means in a predetermined sequence, said timing means including means operative to step said counter means from one to a next count at preselected time intervals to produce a plurality of output control signals operative to control a plurality of traffic signal lights in sequence, transfer means for selectively transferring a control signal operative to step said counter means for a selected first one to a selected second one of said counts under the control of said timing means, a second module having control means for controlling the transfer of said control signal via said transfer means, and separable coupling means for selectively connecting said second module to said transfer means to cause said control means to govern the transfer of said control signal.

16. The traffic signal controller of claim 15 in which said transfer means includes a plural terminal connector, said control means comprising a separable electrical jumper between selected terminals of said connector.

17. The traffic signal controller of claim 15 in which said second module includes vehicle-responsive means, said control means including means normally inhibiting the transfer of said control signal, and means coupling said vehicle-responsive means to said control means for initiating the transfer of said signal.

18. The traffic signal controller of claim 15 in which said control means comprises further counter means and means coupling said timing means to said further counting means via separable said coupling means for operating said further counting means after operation of said selected first count and prior to operation of said selected second count.

No references cited.

THOMAS B. HABECKER, *Primary Examiner.*